US009718532B2

(12) United States Patent
Bray

(10) Patent No.: US 9,718,532 B2
(45) Date of Patent: Aug. 1, 2017

(54) WING AND APPLICATION THEREOF

(71) Applicant: Robert Reginald Bray, Johannesburg (ZA)

(72) Inventor: Robert Reginald Bray, Johannesburg (ZA)

(*) Notice: Subject to any disclaimer, the term of this patent is extended or adjusted under 35 U.S.C. 154(b) by 113 days.

(21) Appl. No.: 14/647,500

(22) PCT Filed: Nov. 25, 2013

(86) PCT No.: PCT/ZA2013/000090
§ 371 (c)(1),
(2) Date: May 27, 2015

(87) PCT Pub. No.: WO2014/085835
PCT Pub. Date: Jun. 5, 2014

(65) Prior Publication Data
US 2015/0321745 A1 Nov. 12, 2015

(30) Foreign Application Priority Data
Nov. 28, 2012 (ZA) .................................. 2012/08969

(51) Int. Cl.
*B64C 3/26* (2006.01)
*B63H 9/06* (2006.01)
*B64C 3/14* (2006.01)

(52) U.S. Cl.
CPC ............. *B64C 3/26* (2013.01); *B63H 9/0607* (2013.01); *B64C 2003/142* (2013.01); *Y02T 50/12* (2013.01); *Y02T 70/583* (2013.01)

(58) Field of Classification Search
CPC .. B63H 9/067; B64C 2003/142; Y02T 70/583
See application file for complete search history.

(56) References Cited

U.S. PATENT DOCUMENTS 4,386,574 A * 6/1983 Riolland ............... B63H 9/0607
114/102.26
4,530,301 A * 7/1985 Latham ................ B63H 9/0607
114/39.31

(Continued)

FOREIGN PATENT DOCUMENTS

WO 2010007377 1/2010

OTHER PUBLICATIONS

Search Report for International Application No. PCT/ZA2013/000090 dated Oct. 10, 2014.

*Primary Examiner* — Brian M O'Hara
*Assistant Examiner* — Keith L Dixon
(74) *Attorney, Agent, or Firm* — Haugen Law Firm

(57) ABSTRACT

The present disclosure relates to a wing. More specifically, aspects of the invention relate to a variable shaped wing movable incrementally between a neutral configuration and a deformed configuration, wherein the wing takes a reflexed camber aerofoil section shape in the deformed configuration. The wing includes a first aerofoil segment and a second aerofoil segment having ends connected or fixed to one another at opposing neutral leading and trailing edges and spaced apart from one another along their lengths across a neutral mean camber line extending between the neutral leading and trailing edges to form a neutral aerofoil section of the wing. One or more actuators deform the wing between the neutral aerofoil section and a reflexed camber aerofoil section, with the first and second aerofoil segments being resilient to bias the wing towards an initial at rest aerofoil section.

19 Claims, 23 Drawing Sheets

(56) References Cited

U.S. PATENT DOCUMENTS

| | | | |
|---|---|---|---|
| 4,757,779 A * | 7/1988 | Graveline | B63H 9/0607 |
| | | | 114/102.26 |
| 5,249,542 A | 10/1993 | Latham | |
| 5,271,349 A * | 12/1993 | Magrini | B63H 9/0607 |
| | | | 114/102.33 |
| 5,603,276 A * | 2/1997 | Julien | B63H 9/06 |
| | | | 114/39.21 |
| 5,671,690 A | 9/1997 | Trost | |
| 5,868,092 A | 2/1999 | Milidragovic | |
| 7,114,456 B2 * | 10/2006 | Sohy | B63H 9/0607 |
| | | | 114/102.22 |
| 7,574,972 B1 * | 8/2009 | Fairchild | B63H 9/0607 |
| | | | 114/102.22 |
| 8,973,511 B2 * | 3/2015 | Holemans | B63B 1/12 |
| | | | 114/39.23 |
| 9,145,198 B1 * | 9/2015 | Shome | B64C 3/48 |
| 9,308,979 B2 * | 4/2016 | Mostoviy | B63H 9/0607 |
| 2001/0047745 A1 | 12/2001 | Abshier | |
| 2002/0100406 A1 | 8/2002 | Costa | |
| 2004/0206286 A1 | 10/2004 | Petretto | |

* cited by examiner

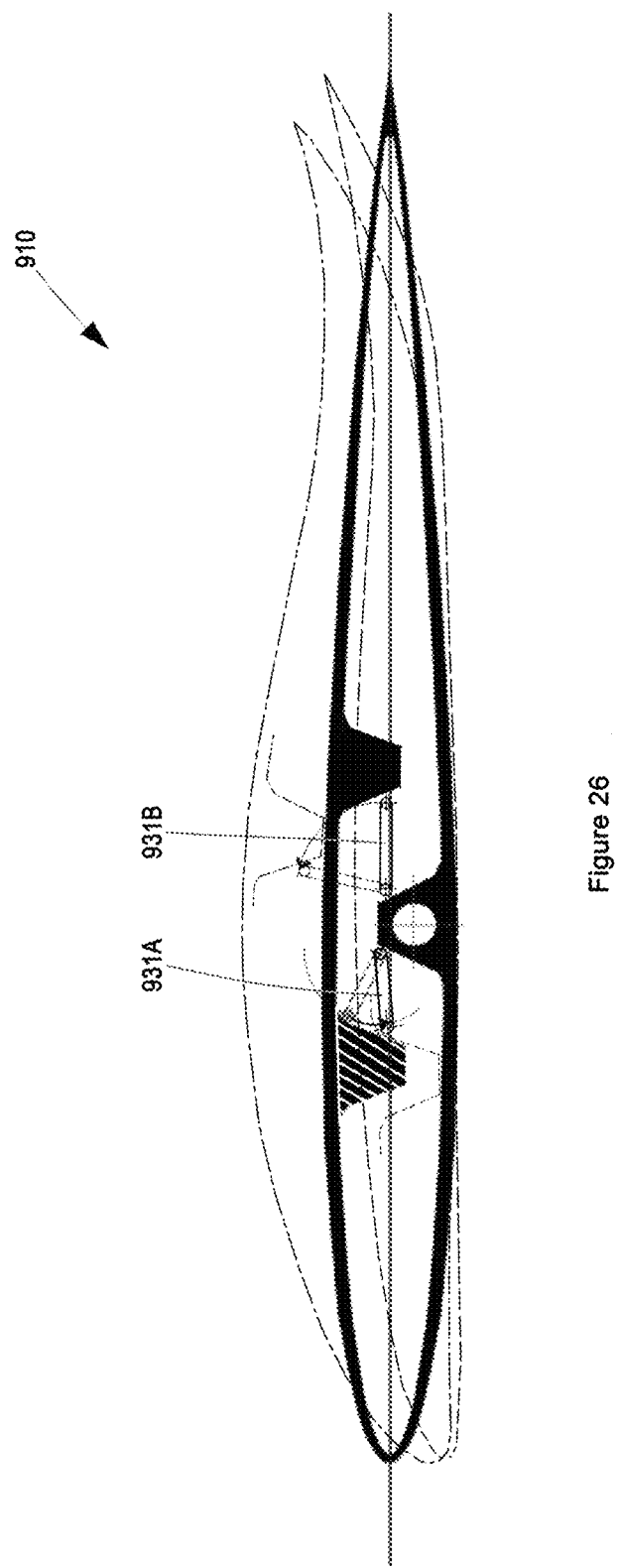

WING AND APPLICATION THEREOF

BACKGROUND

The present disclosure relates to a wing. More specifically, aspects of the invention relates to a variable shaped wing movable incrementally between a neutral configuration and a deformed configuration, wherein the wing takes a reflexed camber aerofoil section shape in the deformed configuration.

The camber of an aerofoil or wing can be defined by a mean camber line, which is the curve that is halfway between the upper and lower surfaces of the aerofoil and passing through the aerofoil's leading and trailing edges, that is forward most and rear most points respectively. An aerofoil where the camber line reverses curvature direction near the trailing edge is called a reflexed camber aerofoil.

Reflex aerofoils are the type of section used in flying wing aircraft due to the inherent tendency of the shape to induce a rotational moment to the trailing edge of the wing, so as to replace the more traditional tail plane surface that is used to maintain the wing at a stable positive angle of attack. This wing section, when used in a flying wing or blended wing/fuselage configuration, has considerable advantages in aircraft design where the omission of the tail boom and tail plane reduces drag by a large factor and improves efficiency, fuel consumption and performance.

In general, wings having variable shape aerofoil sections for the purpose of varying lift characteristics are known and have been achieved in the past in many difference ways. One way is by using a fabric to form the skin of the aerofoil as, for example, disclosed by LATHAM, U.S. Pat. No. 4,530,301. Fabrics are inherently stretchable, accommodating the change in overall perimeter length as the aerofoil is manipulated between differently shaped aerofoil sections. The change in aerofoil section perimeter length does not enable the aerofoil to be deflect into a reflexed camber aerofoil section. The inability of fabric to resist and transmit compressive loads further prevents this type of aerofoil to be deflected into a reflexed camber aerofoil section. The fabric of this type of aerofoil is generally pulled taut over fixed leading and/or trailing edge formations, such as leading and/or trailing edge guide wires, further restricting the aerofoil from taking a reflexed camber aerofoil section.

Another type of aerofoil employs a sliding joint along the aerofoil section that takes up a change in the overall perimeter length of the aerofoil section as it is moved between its various aerofoil section shapes. GRANT, U.S. Pat. No. 2,022,806 teaches of an aerofoil having a sliding joint positioned at a leading edge or at any position along the underside of the aerofoil. Another example is FERGUSON, U.S. Pat. No. 4,624,203, disclosing a wing sail having a variable aerofoil section with a sliding joint positioned at a trailing edge thereof. With the sliding joints enabling length changes in the overall perimeter of these types of aerofoils, the ability to deflect the trailing edge into a reflexed camber aerofoil section is not possible.

EP 1,535,835 issued to RAUTIO et al also teaches of a sliding joint type aerofoil. The significance of this sliding joint type aerofoil is that it appears to have the ability of taking a very slight reflexed camber aerofoil section shape. However, the hinge points about which the nose of this aerofoil is deformable with respect to the rest of the aerofoil forms an indent along the aerofoil section, not conducive to forming a smooth, continuous and efficiently shaped aerofoil section. Furthermore, with this aerofoil not being closed, it is possible for dirt to collect within the hinges and the sliding joint, which is detrimental to the safe and reliable operation of the aerofoil, particularly in aviation applications.

Other types of variable aerofoils having the ability of producing an aerofoil section having a S-shaped camber line normally associated with reflexed camber aerofoil sections will be referred to generally in this description as spine-supported flexing aerofoils and rotating cam aerofoils.

An example of a spine-supported flexing aerofoil is disclosed by BEAUCHCHAMP el al, U.S. Pat. No. 5,367,970. This patent document teaches of an aerofoil fin structure having nose and tail segments supported on resilient spines cantilevered from opposite ends of a central segment. Cables extending between the nose and tail segments and the central segment can be tensioned to cause the nose and tail segments to move up and down independently of one another. A skin envelopes the aerofoil fin structure, and is manipulated thereby to produce an aerofoil section shape having an S-shaped camber line.

MUELLER, CZ 300,728, discloses an example of a rotating cam aerofoil comprising a structure having a nose segment and a tail segment rotatably mounted to either end of a central segment such that the nose and tail segments are rotatable about a camber line axis passing between the leading and trailing edges of the aerofoil and with respect to the central segment. In this manner the nose is rotatable upwards and the tail is rotatable downwards (or vice versa) independently of one another. A skin encasing the rotating cams rides on the cams and is actuated to form an aerofoil section with an S-shaped camber line.

It is believed that the skins of the abovementioned spine-supported flexing aerofoils and rotating cam aerofoils may in fact have to be made from a stretchable material or tethered to the internal structure such that the skin conforms to the shape of the internal structure to take the various aerofoil section shapes. Furthermore, separate nose, central and tail segments, together with the necessary actuating mechanisms, are needed to create the at least two points of inflection required to form the S-shaped camber line of these aerofoils.

It will be appreciated that the components required for creating the necessary points of inflection make these aerofoils heavier than required, complex and unnecessarily expensive to produce.

Yet another type of variable aerofoil is an articulated type as disclosed by RINN et al, U.S. Pat. No. 6,045,096. The aerofoil includes a skin pulled over an internal articulated structure, which structure enables the tail to "wag" across the neutral camber line and in so doing, vary the aerofoil section of the aerofoil.

Due to the tail portion of the skin, or a significant part thereof, being directly supported on the internal articulated structure, the tail itself is unable to deflect between convex and concave shapes as required to form a reflexed camber aerofoil section. Many of these types of aerofoils also have a fixed, non-movable leading edge, which is not conducive to variably forming efficient aerofoil sections. Similarly, as is the case with spine-supported flexing aerofoils and the rotating cam aerofoils, the articulated aerofoils are also heavier than required, complex and unnecessarily expensive to produce.

CAMPANILE et al, U.S. Pat. No. 6,010,098 discloses an aerofoil having a deformable self-supported rigid outer skin shell, or a rigid skin supported over deformable external girdles. Although this aerofoil appears to be capable of providing a variety of smooth aerofoil sections, the aerofoil is overly complicated requiring multiple struts to deform the outer skin. Furthermore, there is not mention of the outer skin being resilient and inherently returnable to a neutral position.

Further shortcomings of this invention include the positioning of the supporting structure, which fixes at least two points on the underside of the aerofoil to an external structure such as an aeroplane and the asymmetrical neutral shape of the aerofoil section. Both of the aforementioned features lead to the ability of the aerofoil to take an aerofoil section shape having a wavy-like camber, but not a pure reflexed camber aerofoil section shape. As a result, the trailing edge of the aerofoil is incapable of taking a concave shape on the upper side thereof (i.e. always a convex shape), forcing airflow off the upper side to always be directed from the trailing edge operatively downwardly.

SUMMARY OF THE DISCLOSED EMBODIMENTS

According to aspects of the invention there is provided a wing including:
- a first aerofoil segment and a second aerofoil segment having ends connected or fixed to one another at opposing neutral leading and trailing edges thereby preventing the ends of the first and second aerofoil segments from sliding relative to one another, wherein the first and second aerofoil segments are spaced apart from one another along their lengths across a neutral mean camber line extending between the neutral leading and trailing edges to form a neutral aerofoil section of the wing, and further wherein the trailing edge is free to move across the neutral camber line;
- one or more actuators for deforming the wing between the neutral aerofoil section and a reflexed camber aerofoil section;
- the first and second aerofoil segments being resilient to bias the wing towards an initial at rest aerofoil section;
- wherein the critical buckling load of the aerofoil segments is greater than a compressive load generated in the aerofoil segments by the actuator deforming the wing between the neutral aerofoil section and the reflexed camber aerofoil section;
- such that when the wing is deformed by the actuator, displacement between two points on one of the aerofoil segments generates the compressive load in at least such aerofoil segment, and the ability of such aerofoil segment(s) to resist the compressive load causes such segment(s) to adopt a form with a point of inflection, thereby causing the wing to form the reflexed camber aerofoil section.

The initial at rest aerofoil section is typically the section wherein in use all forces from the actuator are removed from the wing. The initial at rest aerofoil section may be the neutral aerofoil section, the reflexed camber aerofoil section or any aerofoil section therebetween.

Preferably, the wing is deformable between the neutral aerofoil section and the reflexed camber aerofoil section progressively, thereby enabling the wing to be deformed by the actuators into a plurality of incrementally different aerofoil sections. Some of the incrementally different aerofoil sections of the wing may further have an increased or decreased dimension of maximum thickness, with or without a reflexed camber.

Generally, the deformation of the wing causes displacement between the two points on one of the aerofoil segments to reduce, the reduced displacement generating the compressive load in such aerofoil segment and the ability of such aerofoil segment to resist the compressive load causes such segment to adopt a form with a point of inflection, thereby causing the wing to form the reflexed camber aerofoil section.

It will be appreciated that the reduction in displacement between the two points on one of the aerofoil segments causes an increase in displacement between two points on the other of the aerofoil segments and as such, bending in such aerofoil segment. It will be appreciated further that the compressive and tensile loads, together with the bending jointly contribute to the causing of the wing to form the reflexed camber aerofoil section.

In one embodiment, the first and/or second aerofoil segments may each be formed from a single aerofoil member spanning between the leading and trailing edges, or formed from a plurality of aerofoil members connected or fixed end-to-end between the leading and trailing edges, jointly forming a continuous closed loop aerofoil rib. In a first alternative embodiment, the first and/or second aerofoil segments may be a single integral aerofoil member forming a continuous closed loop aerofoil rib.

Generally, the wing may be formed from a plurality of ribs spaced apart relative to one another to define an elongate wing framework for supporting a skin over which fluid is flowable in use, the skin being a continuous closed loop skin member having a trailing edge coinciding with the trailing edge of the wing framework.

Typically, the skin member is semi-rigid and resilient to bias, independently or jointly with the aerofoil segments, the wing towards the initial at rest section, the skin member further having a critical buckling load similar to that of the aerofoil segments.

Alternatively, the skin member is fabric and the wing framework is configurable between an erected position, wherein the plurality of ribs are retained in a spaced apart relationship to pull the skin member tort over the wing framework, and a collapsed position, wherein the ribs are movable towards, against or substantially to nest within one another to collapse the wing into a compact size for transportation and/or storage, with the fabric skin folded over itself in a concertina fashion.

Generally, the plurality of ribs are secured to the skin member at spaced intervals between first and second opposing ends thereof, the first and second opposing ends of the skin member further being connectable, at or near the respective ends, to first and second opposing ends of a collapsible mast being movable between an extended position, wherein the skin member and consequently the ribs secured thereto are urged into the erected position, and a retracted position, wherein the skin member and consequently the ribs secured thereto are returned into the collapsed position.

Each of the ribs are typically configured such that with the wing framework in the erected position, the respective leading edges and trailing edges of adjacent ribs abut one another so as to provide the wing framework with substantially rigid leading and trailing edges, enabling the wing framework to operate at high speeds. To enable the aforementioned configuration, each rib preferably comprises respective leading and trailing edge abutment formations, each of the leading and trailing edge abutment formations extending outwardly in opposite directions from the rib, such that in use, they extend toward the first and second ends of the erected wing framework.

Generally, the ribs each comprise a stiffening formation projecting inwardly from the first and the second aerofoil segments, typically at locations between the leading and trailing edge abutment formations, for providing a lightweight, stiffened rib.

In one preferred embodiment, a cross-section of the rib at the stiffened location is substantially L-shaped, with the upright leg thereof being the first or the second aerofoil segment and the substantially horizontal leg being the stiffening formation, the stiffening formation doubling up as a support surface on which a super-jacent nesting rib is capable of resting with the wing framework in the collapsed position.

Preferably, the collapsible mast is from a group of collapsible masts including a telescoping mast, a scissor lift mast, a piston mast or other type of collapsible mast.

In a second alternative embodiment, the first and second aerofoil segments may be opposing first and second members of an elongate aerofoil shell spaced apart from one another across the neutral camber line, the first and second members each being single aerofoil members, a plurality of aerofoil members connected or fixed end-to-end or integral with one another to form a continuous closed loop aerofoil section, and further wherein the outer surface of the shell is a skin over which fluid is flowable in use. Preferably, the shell is self-supporting and semi-rigid.

The materials from which the shell is typically made from stiff, sheet-like material, the type largely dependent on the given application of the wing. Heavy, strong, rust proof sheet-like material such as stainless steel is suitable, for example, on a keel of a vessel to resist the overturning action of the sail in the wind. A stabilizing fin on a ship for example, might be manufactured from a similar steel or metallic sheet-like material, or alternatively from a heavy duty composite construction material.

On aircrafts, lightweight stiff materials such as carbon fiber composite sheet or plywood laminate sheet are most suitable. On a wingsail to propel a land yacht or a sailing vessel, the material is generally lightweight foam and composite fiberglass sheet material, plywood and/or sheet-like aluminum. Multiple combinations and layers of stiff sheet-like material with different characteristics in, amongst others, flexure, strength, durability, finish, aesthetics and and/or weight, may be integrated into the wing shell surfaces to produce a wing suited to the practical use intended therefor.

Irrespective of the material used, the surface finish of the outside of the wing is preferably smooth to effect low drag characteristics. The required surface finish might be inherent with the material used, or by using high gloss paint finishes and gel coats. It will be appreciated that the outer surfaces of the wing are perfectly suited to presenting indicia thereon, for example, graphics, branding, advertising, etc.

Through the range of deformations of the wing between the neutral aerofoil section and the reflexed camber aerofoil section forms, the trailing edge preferably remains common while the location of the leading edge on the wing may be variable.

Furthermore, through the range of deformations of the wing between the neutral aerofoil section and the reflexed camber aerofoil section forms, the overall perimeter of the aerofoil section remains substantially constant while the individual lengths of the first and second segments, as measured between the common trailing edge and the variable location of the leading edge, may be variable.

Preferably, the leading edge is variable about a nose portion of the aerofoil section of the wing, the nose portion being more easily deformable than remaining portions of the wing. Typically, the nose portion is thinner in dimension and/or is made from a less stiff material than the remaining portions of the aerofoil section to promote deformation of the nose portion.

Generally, one or more other areas of the remaining portions of the aerofoil section are thinned in dimension and/or made from a less stiff material to promote localized deformation in these areas, thereby enabling the wing to be deformed in use in a more predetermined manner.

The tips of the wings, spaced apart from one another across a wing span of the wing, may each be connected to an object and/or to end plates, the object or end plates in use reducing the effects of wingtip vortices generated by the flow of fluid flowing over the skin of the wing and/or permit deformation of the wing while sealing the open ends of the hollow wing thereby reducing drag. A gap defined between the object and/or end plates and the wing may be sealed by a seal or gasket. The seal or gasket may be made from Neoprin.

For some applications of the wing, it is preferable that the neutral aerofoil section is symmetrical about the neutral camber line and deformable to either side thereof into the reflexed camber aerofoil sections such that the neutral aerofoil section is intermediary the two fully deformed reflexed camber aerofoil sections, thereby providing a fully reversible variable aerofoil section wing.

Alternatively, the neutral aerofoil section is a reflexed camber aerofoil section and the reflexed camber aerofoil section to which the wing is deformable is a more pronounced reflexed camber aerofoil section. Furthermore, the neutral aerofoil section may be an under cambered lifting aerofoil section.

Preferably, the neutral and/or the reflexed camber aerofoil section is an under cambered lifting aerofoil section, with the aerofoil segment in which the under camber is formed assuming an increasingly tighter concave shape with the aerofoil section progressively deforming from the neutral aerofoil section. More preferably, the assumed concave shape is formed in a location of the aerofoil section within or near a zone of maximum thickness thereof.

For other applications, the neutral aerofoil section and the reflexed camber aerofoil section are lifting sections, the neutral aerofoil section being asymmetrical with respect to the neutral camber line. Typically, the neutral aerofoil section and the reflexed camber aerofoil section are under cambered aerofoil sections. This wing is generally useful in slow speed fluid mediums, where high lift characteristics are required. In higher speed applications, the reflexed camber aerofoil section is a lifting section, but not necessarily an under cambered section, which could cause unwanted high drag and de-lamination of laminar flow.

Generally, the actuators are abuttable with and/or connected to actuation points on the wing or on an anchor structure other than the wing. Where there are connections with the actuation points, the connections may be rigid, flexible and/or hinged.

Typically, the actuation points and the actuators, at least partially or wholly, are located within a wing volume defined by the skin and the wing span of the wing thereby protecting the actuation points and those portions of the actuators housed within the wing volume from the elements and concealing them from view.

The actuators may be extendible and/or retractable arms capable of pushing and/or pulling on the actuation points, thereby to deform the wing. Alternatively, the actuators are cables capable of pulling on the actuation point, thereby to deform the wing.

The actuators in a further embodiment may be in the form of a spar or mast extending fully or at least partially the wing span of the wing, the spar or mast being split longitudinally into split spar or mast halves, the split halves having first sides being slidable relative to one another on a plane substantially co-planar with the neutral camber line and second sides having formations for displacing the actuation points.

The actuators in another embodiment may be in the form of a spar or mast extending fully or at least partially the wing span of the wing, with one or more sliding plates. The sliding plates having first sides being slidable relative to outer sides of the spar or mast on a plane substantially parallel with and spaced transversely relative to the neutral camber line and second sides having formations for displacing the actuation points.

The actuators in yet another embodiment may be in the form of a spar extending fully or at least partially the wing span of the wing and being rotatable about a longitudinal axis extending through the wing span of the wing, the spar having formations for displacing the actuation points. Preferably, this embodiment further incorporates one or more cross brace struts extending transversely over the neutral camber line between bracing point on the wing. More, preferably the rotatable spar and the cross brace are located, relative to one another, such that the rotatable strut is nearer the leading edge and the cross brace is nearer the trailing edge.

In yet another alternative but particularly preferred embodiment, the actuators are one or more actuated spars extending fully or at least partially the wing span of the wing, the edges of the spars being abuttable with or connected to the actuation points. It will be appreciated that the number of actuators to operate the entire deformation of the wing can be reduced to one, such method being the most economic, most lightweight and easiest to maintain.

The actuated spars may be supported by and/or between the object and/or the end plates, the spars being mounted substantially parallel with and spaced from the neutral camber line. Typically, the actuated spars are displaceable longitudinally and/or rotatably with respect to the neutral camber line and/or one another.

Preferably, the actuated spars are supported by and/or between the object and/or the end plates, the spars being mounted substantially transversely across the neutral camber line and displaceable transversely and/or rotatably with respect to the neutral camber line and/or one another.

More preferably, the wing comprises a main spar at or near the zone of maximum thickness of the wing, a leading edge spar located between the leading edge of the aerofoil section and the main spar, and a trailing edge spar located between the trailing edge of the aerofoil section and the main spar.

Generally, the leading edge spar is located closer to the leading edge than to the main spar. Typically, the trailing edge spar is located closer to the trailing edge than to the main spar. Preferably, the trailing edge spar is located a third of the distance back from the trailing edge towards the main spar along the neutral camber line.

The main, leading or trailing edge spars may be rotatably supported on the object or the end plates and the other of the main, leading or trailing edge spars may be connected to the object or the end plates and to the wing across or near the zone of maximum thickness, the object and/or the end plates being movable by the actuator to cause the spars to displace transversely across the neutral camber line and with respect to one another.

In an alternative embodiment, one or more of the main, leading or trailing edge spars are each a pair of spar members having opposing edges being abuttable with or connected to the actuation points and proximate edges movable jointly or relative to one another across the neutral camber line thereby enabling the aerofoil section to be deformed to vary the maximum thickness of the wing with or without deforming the aerofoil section into the reflexed camber aerofoil section.

In yet another alternative embodiment, the spar pairs are replaced with integral thickened portions extending partially or fully the length of the wingspan of the wing running at or near the areas where the spars pairs would normally abut with or connect to the actuation points, the one or more actuators being engageable with the integral thickened portions enabling deformation of wing using fewer actuation fixing points.

The location of the point of inflection created along the deformed segment of the reflexed camber aerofoil section is variable with the varying degrees of deformation of the aerofoil section. The point of inflection in the deformed segment of the reflexed camber aerofoil section may be multiple inflection points, but is preferably a single point of inflection defined thereon between the leading and trailing edges.

Preferably, the deformed segment defines a continuously sinusoidal shape, the continuously sinusoidal shape being defined in the last third of the length of the segment as measured from the trailing edge. More preferably, the deformed segment defines a continuously sinusoidal shape, the continuously sinusoidal shape being defined in the last two thirds of the length of the segment as measured from the trailing edge. Most preferably, the deformed segment defines a continuously sinusoidal shape along its entire length between the leading edge and the trailing edge.

Generally, the aerofoil section is deformable such that the leading edge is deformed toward one side of the neutral camber line and the trailing edge is deformed to an opposite side of the neutral camber line to form the reflexed camber aerofoil section.

In use in a prevailing fluid flow, being air such as wind or liquid such as water, the deformation of the wing toward a first side of the neutral camber line generates a lifting force in a primary direction, while the deformation of the wing toward a second opposite side of the neutral camber line generates a lifting force in a secondary direction being substantially opposite to the primary direction, the reversibility of the wing and the lifting forces generated thereby act as a braking and/or reversing means on the wing.

The wing may be rotatable about an axis of rotation extending through the opposing wingtips thereof. Preferably, the wing is tilted relative to the axis of rotation such that the distance between the axis of rotation and the leading edge is smaller at one wingtip of the wing and greater at the opposite wingtip thereof. More preferably, the wing is tilted relative to the axis of rotation such that the axis of rotation is closer to the leading edge at one wingtip of the wing and closer to the trailing edge at the opposite wingtip thereof.

Typically, the wing is divided by the axis of rotation into a leading edge part, defined between the leading edge, the axis of rotation and the opposing wingtips, and a trailing edge part, defined between the trailing edge, the axis of rotation and the opposing wingtips.

Preferably, the leading edge and trailing edge parts of the wing have substantially the same weight thereby to balance the wing about the axis of rotation and, for example, counter unwanted rotation thereof caused by the force of gravity and under a rolling action in the application of a water-craft at sea. More preferably, the trailing edge part of the wing is heavier than the leading edge part thereof thereby to, with reference to the aforementioned water-craft example, act as a self-righting feature and reducing the risk of the water-craft from capsizing.

The desired weighting of the wing about the axis of rotation may be obtained by weighting the wing in specific locations relative to the axis of rotation, by the strategic positioning of the actuators, other heavy components and/or weights in or on the wing and/or the end plates. Most preferably, the weighting is within the volume of the wing, doing away with the need for protruding mounting booms for the external placement of weights.

The tilt of the wing relative to the axis of rotation places a greater surface area of the wing operatively ahead of the axis of rotation, as compared to that of existing prior art setups. With reference still to the water-craft example, oscillation of the wing caused in use by the rolling and yawing of the water-craft at sea, greatest at the operatively upper most free end of the wing, is countered by the increased surface area of the leading edge part of the wing reducing the flapping effect caused by oscillation on the wing.

Preferably, the surface area of the trailing edge part of the wing is greater than the surface area of the leading edge part thereof. With reference to the aforementioned water-craft example, the greater surface area of the trailing edge part of the wing as compared to the smaller surface area of the leading edge part thereof enables the wing to more easily rudder into the wind in a prevailing wind direction.

The axis of rotation in use may be perpendicular to the prevailing wind direction, or tilted toward or away the prevailing wind direction.

Typically, the wing has a tapering shape along its wingspan between the wingtips such that a chord line of the neutral aerofoil section as measured between the neutral leading edge and the trailing edge is shorter at one wingtip and longer at the opposite wingtip, the longer chord of the aerofoil section producing a more pronounced reflexed camber aerofoil section assisting the wing to automatically rudder about the axis of rotation between larger angles of attack. The tapering shape of the wing may be variable by means of an extension panel being retractable into and/or extendible from or over the trailing edge of the wing.

The operation of the wing may be controllable via one or more control systems, the control system including:
- one or more inputs for receiving inputs from one or more anemometers for measuring fluid speed and/or direction, fluid-driven turbine, gyroscopes, accelerometers, strain gauges, pressure sensors, position sensors and/or inclinometers.
- one or more inputs for receiving user inputs;
- a databases, protocols and/or programmes against which the sensor inputs and/or the user inputs are interrogatable; and
- one or more outputs for controlling the operation of the wing based in use on the interrogation of the sensor inputs and/or the user inputs against the databases, protocols and/or programmes.

The user inputs typically include on/off control, actuator control for deforming the wing between the initial at rest aerofoil section and the reflexed camber aerofoil section, control for moving the wing between the erected and collapsed positions and/or a kill switch.

The control outputs generally include actuations of actuators for deforming the wing, actuation of the wing between the initial at rest aerofoil section and the reflexed camber aerofoil section and one or more safety overrides for bringing the wing into a safety condition.

Preferably, the wing comprises a stall prevention protocol including:
- a database containing at least a plurality of prevailing fluid speeds and corresponding allowable degrees of aerofoil section deformation that will prevent the aerofoil section from deforming into a wing that will automatically set an angle of attack causing stall;
- a means for measuring prevailing fluid speeds, the measuring means in use capable of generating an input value from the actual measured prevailing fluid speed;
- an input means for inputting the input value into the database and interrogating the database to output an output value in the form of the corresponding allowable degree of deformation; and
- an output means for outputting the output value to the actuator to deform the wing into the allowable degree of deformation.

Typically, the stall prevention system is microprocessor based. The measuring means may take many forms but in one preferred embodiment, the measuring means is a turbine, capable also of generating electrical power for powering the actuators, charging batteries and/or powering other devices on the wing or on the object to which the wing is mountable. Preferably the turbine is mounted to or integral with one of the endplates of the wing.

The wing is preferably rotatable about a support upon which the wing is rotatably mountable to the object. However, for certain applications, the wing may be fixed on a support on which the wing is mountable to the object.

The support may be is secured to and extends laterally from a fuselage of an aircraft, the wing being one or more main wings, horizontal tail stabilizers, vertical stabilizers, elevators and/or rudders. Alternatively, the support is secured to and extends from a hub or rotor mast, the wing being one or more blades on a propeller, rotor and/or fluid-driving or driven turbine. In another alternative embodiment, the support is on a power generating device, the wings being one or more reciprocating blades of rotary blades being driven by fluid energy.

The support may be secured to a land-craft, the wing being: one or more wings for generating a righting force to resist rolling; one or more wings for generating down-force for increased traction; and/or one or more wingsail for propelling the land-craft, the support for each of the wingsails being a mast extending from the land-craft.

Preferably, the support is secured to a water-craft, the wing being: one or more rudders for steering the water-craft; one or more keels for stabilising the water-craft; one or more hydrofoils for lifting the water-craft; and/or one or more wingsails for propelling the water-craft, the support for each of the wingsails being a mast extending from the water-craft.

To provide active roll control, the keel is preferably one or more active keels extending operatively outwardly from a hull of the water-craft, with the keels being deformable to in use generate a righting force resisting rolling or inclination of the water-craft. More particularly, the active keels in use generate a lifting force substantially opposing the lifting force generated by the wingsail. Generally, the deformation of the one or more keels is controllable via the control system.

The mast may extend outwardly from one of the wingtips of the wing and is receivable within a corresponding mast receiving formation on the land- or water-craft, or wherein the mast extends outwardly from the land- or water-craft and is receivable within a corresponding mast receiving formation defined in the wing at one of the wingtips. Preferably, the mast is a stub mast comprising a damper for reducing oscillation of the wingsail caused, for example, by wave action.

According to a second aspect of the invention, there is provided a power generating device comprising one or more reciprocating or rotating blades each in the form of a wing as herein described and illustrated.

According to a third aspect of the invention, there is provided a keel in the form of a wing as herein described and illustrated.

According to a fourth aspect of the invention, there is provided a hydrofoil in the form of a wing as herein described and illustrated.

According to a fifth aspect of the invention, there is provided a rudder in the form of a wing as herein described and illustrated.

According to a sixth aspect of the invention, there is provided a propulsion member in the form of a wing as herein described and illustrated. Generally, the propulsion member is one or more wingsails on a land- or water-craft. It will be appreciated that the propulsion member may comprise one or more wings configured to form a propeller.

According to a seventh aspect of the invention, there is provided a lift generating member in the form of a wing as herein described and illustrated. The lift generating member may be a lifting wing, a rotor, a propeller and/or a tail plane of an aircraft.

According to an eighth aspect of the invention, there is provided an aircraft, manned or remotely controlled, comprising a lifting wing, a rotor, a propeller and/or a tail plane in the form of a wing as herein described and illustrated.

Preferably, the lifting wing is rotatably mounted to a fuselage of the aircraft and rotatable with respect to the fuselage about an axis of rotation extending laterally outwardly from the fuselage and through the wingtips of the lifting wing, enabling the lifting wing deformed towards the reflexed camber aerofoil section to rotate about the axis of rotation to in use automatically set an angle of attack to provide lift to the aircraft while substantially maintaining the fuselage in a level orientation throughout take-off, flight and landing. It will be appreciated that the aircraft may also include a rudder in the form of a wing as herein described and illustrated.

According to a ninth aspect of the invention, there is provided a craft, manned or remotely controlled, comprising a propulsion member as herein described and illustrated. The propulsion member may be a wingsail and/or blades on a propeller.

Where the propulsion member is a wingsail, the wingsail may include a spinnaker being retractable into and deployable from the wingsail in the event of the direction of the prevailing fluid flow being downwind with respect to the direction of travel of the craft. Typically, the spinnaker is deployable automatically by a deployment actuator triggerable by a fluid direction sensor. Generally, the spinnaker is retractable and deployable on a track running along the trailing edge of the wingsail.

The craft may further comprise of a cockpit enclosed by a windshield being slidably movable longitudinally with respect to the craft between an open position, wherein the cockpit is uncovered enabling persons to climb in and out of the cockpit, and a closed position, wherein the cockpit is covered. For specific applications, the enclosed cockpit in the closed position is preferably waterproof.

Generally, the craft comprises a sensor, for example a pressure sensor, located at least on or under a seat of the person piloting the craft for the purposes of sensing the presence of the pilot under their weight and, in the event of no presence of the pilot being sensed by the pressure sensor, disengaging the actuators from deforming the wingsail and enabling the wingsail to return to the neutral aerofoil section form. Preferably, the pressure sensor is calibrated to enable operation of the craft on sensing a pressure arising from the weight of the pilot of a predetermined minimum amount, thereby preventing for example, children from piloting the craft.

Furthermore, the craft comprises a kill switch operable by the pilot to bring the craft to a halt as quickly and safely as possible.

The craft comprises simple controls including a forward-reverse control and a directional steering control. The forward-reverse control actuates the actuators to deform the aerofoil section to one side of the neutral camber line to provide forward propulsion, or to deform the aerofoil section to an opposite side of the neutral camber line to provide reverse propulsion or a braking effect. The directional steering control actuates the rudder for enabling the craft to be steered to the left or to the right.

The forward-reverse control is typically automatically reversible upon the trailing edge of the wingsail rotatably crossing over a keel line of the craft. In the event of the trailing edge crossing over the keel line, the aerofoil section may be automatically deformed into the exact reverse of the aerofoil section taken by the wingsail immediately prior to the trailing edge crossing over the keel line, thereby enabling the craft propelled by the pilot in a forward direction to remain propelled in the forward direction with a reversed aerofoil section without any input or knowledge of the change in aerofoil section by the pilot.

The forward-reverse control includes primary control means on the wingsail and secondary control means on the craft which causes the polarity of the actuators to switch as the wingsail crosses the keel line. For a specific band of critical angle of the wingsail relative to the keel line, the wingsail may be actuated toward or under its own bias forced toward a symmetrical aerofoil section to avoid the drag on the wingsail from becoming is substantially the same or greater than the lift generated thereby. Furthermore, the wingsail may be actuated toward or under its own bias forced toward a symmetrical aerofoil section to avoid where the overturning moment generated by the wingsail becomes greater than a predetermined safety value.

The forward-reverse control may be in the form of magnetic sensors, optical sensors or a mechanical commutator type device as hereafter described.

Preferably, the forward-reverse control includes first and second contacts configured to ride on first and second contact tracks. The first and second contacts may be located on the wingsail or the craft with the first and second contact tracks being located on the other of the wingsail or the craft. Generally, the first and second contacts are configurable with respect to the first and second contact tracks between a first configuration and a second configuration.

In the first configuration, the first and second contacts ride on the first and second contact tracks respectively thereby to communicate to the actuators a forward or reverse signal from the forward-reverse control to deform the aerofoil section into a form that propels the craft forwards or backwards respectively and as per the will of the pilot.

In the second configuration, the first and second contacts ride on the second and first contact tracks respectively thereby to communicate a reverse signal to the actuators such that a forward or reverse signal from the forward-reverse control deforms the aerofoil section into an aerofoil section being exactly reversed from the aerofoil section formed with the contacts and contact tracks in the first configuration thereby to continue propelling the craft as per the will of the pilot.

The craft may be a land-craft or a water-craft. Where the craft is a water-craft, it may further comprise any one or more of a keel, a hydrofoil, a rudder and/or a propeller in the form of one or more wings as herein described and illustrated.

Preferably, the water-craft comprises a main central hull and a pair of outriggers each flanking opposing sides of the main central hull, the outriggers being connected to the main central hull by connecting members extending laterally from the opposing sides of the main central hull. The outriggers may be fixed to the main central hull by the connecting members or removably connected by the connecting members thereto such that the water-craft is collapsible for transportation and/or storage. Furthermore, the wingsail is detachable from the water-craft making it that much more compact for transportation and/or storage.

The outriggers each comprise one or more skegs extending operatively downwardly therefrom and angled towards the main central hull.

Generally, the main central hull comprises a rudder for directional control of the water-craft. The rudder may be pivotally supported on the main central hull operatively ahead of its mid-point to provide better stability and control. Furthermore, the rudder is guarded by a guarding skeg positioned operatively forwardly of the rudder thereby protecting the rudder from impact damage and possible entanglement with debris or aquatic life.

Preferably, the main hull, the outriggers, the skegs and the rudder are shallow draft to avoid damage to coral reefs and to enable the water-craft to operate in shallow waters. More preferably, the wingsail comprises floatation means for preventing the water-craft from fully rolling over in the event of capsizing. Most preferably, the water-craft is a single seat or tandem arranged two-seater tri-maran style water-craft.

BRIEF DESCRIPTION OF THE DRAWINGS

These and other features and advantages of the present device, system, and method will become appreciated as the same becomes better understood with reference to the specification, claims and appended drawings where:

FIG. 26 is a cross-sectional view of a wing, in the form of a wingsail or otherwise, showing yet a further alternative actuator or actuator variant set-up, for enabling variable reflexed camber aerofoil section deformation and variable wing thickness deformation.

DETAILED DESCRIPTION OF THE DRAWINGS

Figure 1:
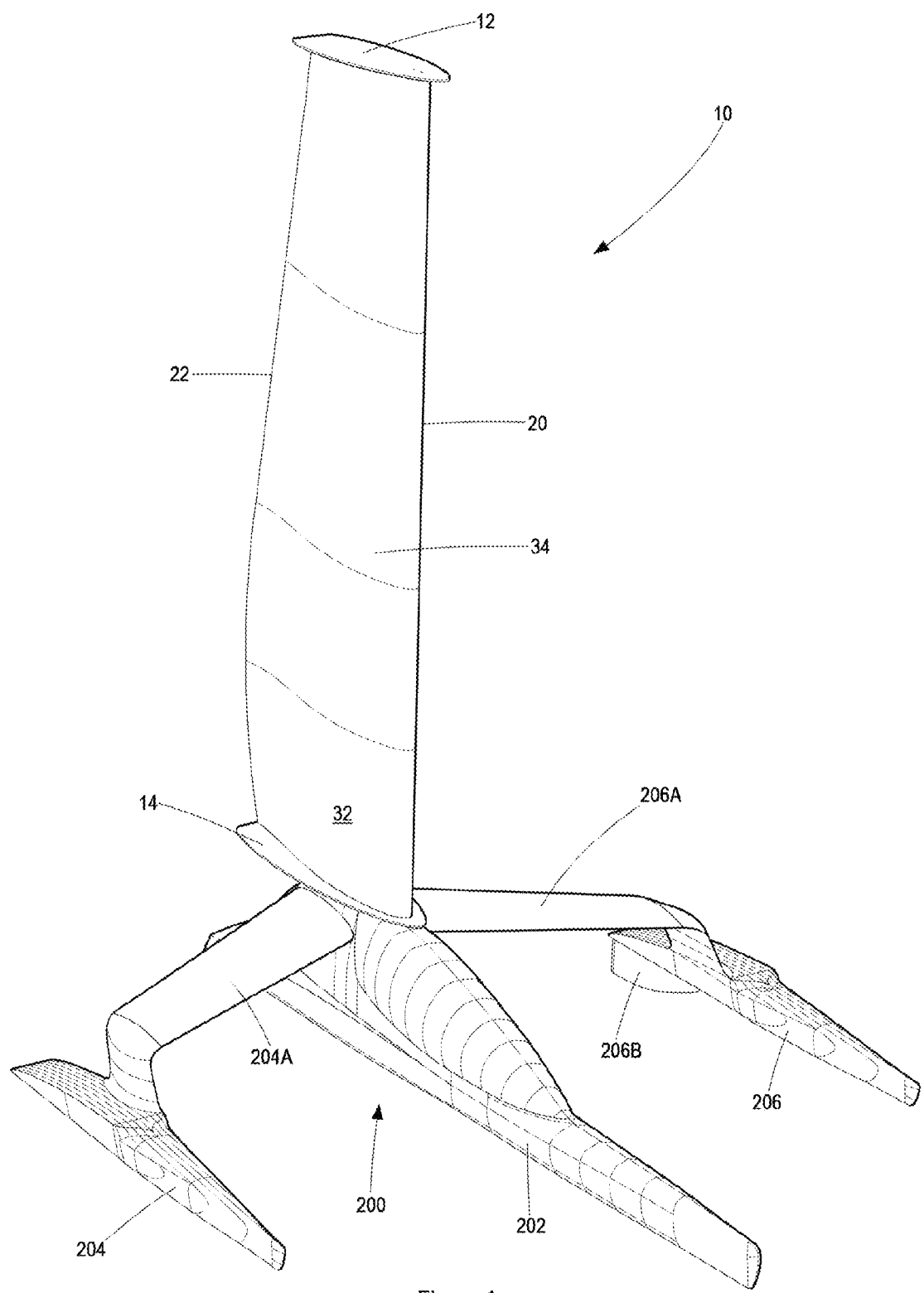
FIG. 1 is a perspective view of a wing in accordance with an aspect of the present invention in an application as a wingsail mounted to a water-craft.

The wing according to the present disclosure, which includes devices, systems, and methods, may be applied to many applications. For the purposes of providing a detailed description of the invention, the wing will be described with reference to its application as a wingsail as applied to a water-craft 200, the wingsail being designated generally in the accompanying figures with reference numeral 10.

Figure 2:
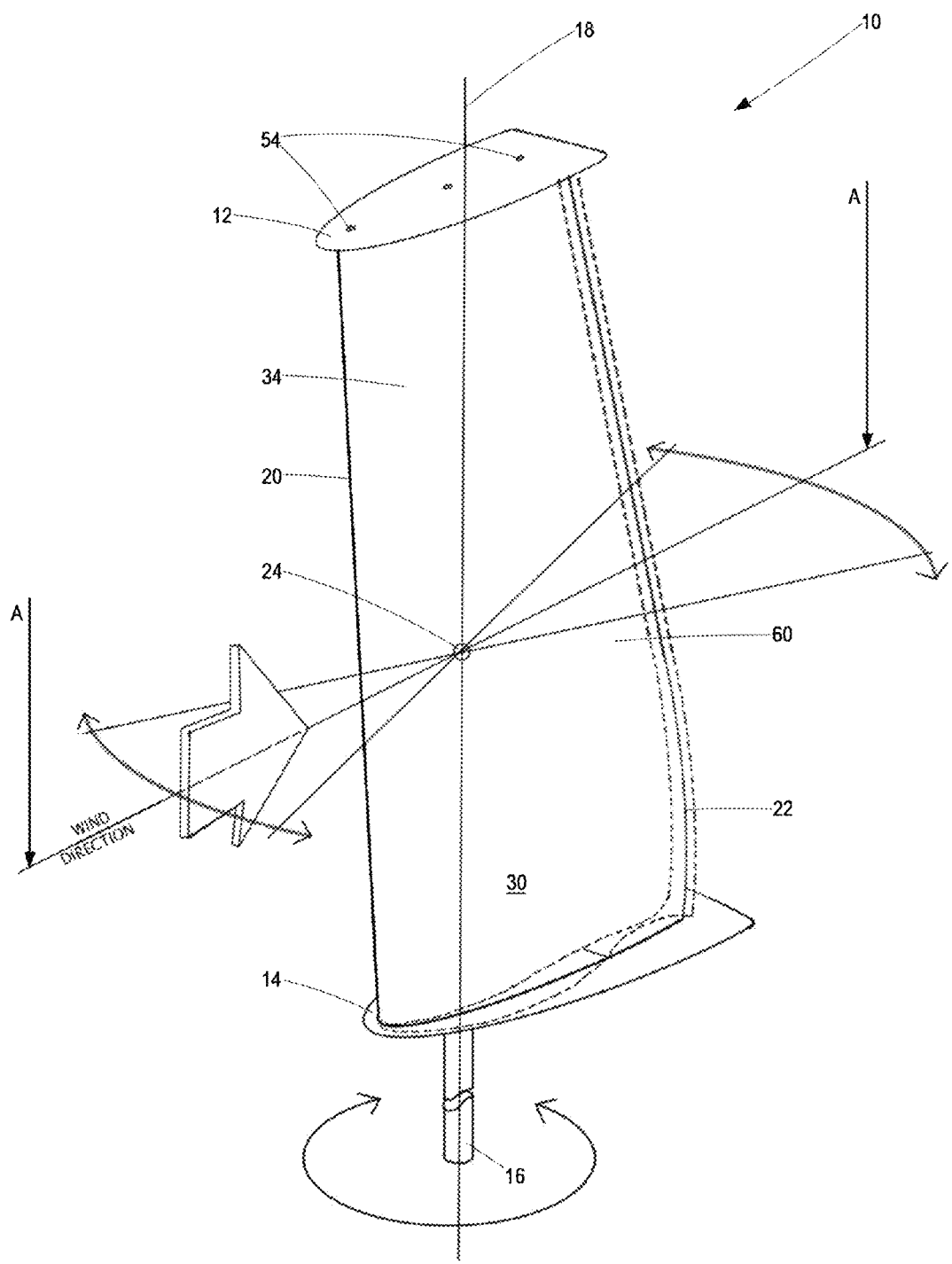
FIG. 2 is a perspective view of the wingsail of FIG. 1.

With reference to FIG. 1 and FIG. 2, the wingsail 10 is supported between a first end plate 12 and a second end plate 14, typically located at the operatively upper and lower wingtips of the wingsail 10 respectively, which act to prevent spillage of airflow over the wingtips of the wingsail 10, and/or into the hollow wingsail 10, from a high pressure to low pressure side thereby preventing, as far as possible, the creation of vortices. A gap (not shown) is defined between the wingsail 10 and the end plates 12, 14 typically closed off by a gasket or seal that allows movement between the wingsail 10 and the endplates 12, 14.

A mast 16 extends downwardly from the second end plate 14 about which the wingsail 10 is rotatable. It will be appreciated that instead of the mast 16 extending downwardly from the second end plate 14, the second end plate 14 may define a mast receiving formation in which a mast extending from the water-craft 200 is rotatably receivable.

In either of the differing mast embodiments, the wingsail 10 is freely rotatable about an axis of rotation 18 thereby enabling the wingsail 10 to automatically set its own angle of attack relative to a prevailing wind direction.

Thus, an aspect of the present wingsail is understood to include a self-setting angle of attack without external aid of steering lines and/or cables. In some examples, steering lines and/or cables may be incorporated to supplement the self-adjusting capability of the wingsail, as further discussed below.

Figure 13:
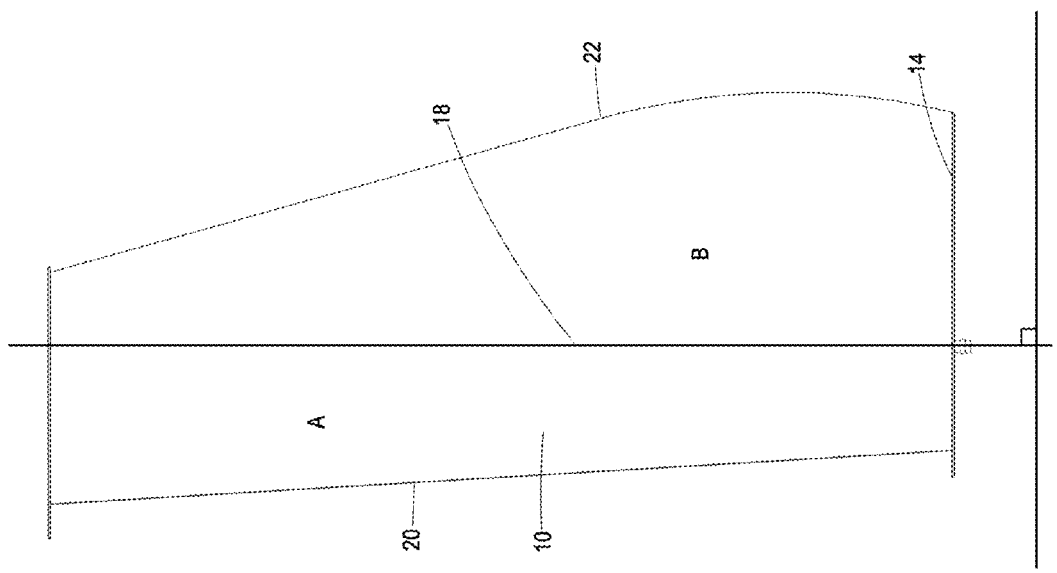
FIG. 13 is a schematic view of the wingsail of FIG. 2.

With reference now also to FIG. 13, the wingsail 10, in an embodiment, is tilted relative to the axis of rotation 18 such that the distance between the axis of rotation 18 and the leading edge 20 at the lower second end plate 14 wingtip of the wingsail 10 is smaller than the distance between the axis of rotation 18 and the leading edge 20 at the upper first end plate 12 wingtip thereof.

More particularly, the wingsail 10 is tilted relative to the axis of rotation 18 such that axis of rotation 18 is nearer the leading edge 20 at the lower second end plate 14 wingtip of the wingsail 10 and nearer the trailing edge 22 at the upper first end plate 12 wingtip thereof. In another example, the wingail 10 is less tilted and a counterweight (not shown) is used to balance the wingsail relative to the axis of rotation 18.

The effect is dividing the wingsail 10, by the axis of rotation 18, into a leading edge part "A" and a trailing edge part "B". In practice, by bringing a greater surface area of the wingsail 10 operatively ahead of the axis of rotation, as compared to existing prior art setups, has the effect of countering high degrees of oscillation at the upper first end plate 12 wingtip of the wingsail 10 caused by yawing and rolling of the water-craft 200 at sea. The unwanted oscillations may be further countered by a damper (not shown) acting on the mast 16.

It will be appreciated that the oscillations of the wingsail 10, arising from the yawing and rolling action of the water-craft 200 at sea, causes the wingsail 10 to flap about the axis of rotation 18. As a counter to this flapping effect, the leading edge part "A" and the trailing edge part "B" of the wingsail 10 have substantially the same weight thereby to balance the wingsail 10 about the axis of rotation 18.

In fact, it is preferable that the trailing edge part "B" of the wingsail 10 is heavier than the leading edge part "A" to restrict the wingsail 10, under the force of gravity acting thereon, from rotating about the axis of rotation in the event of the water-craft 200 leaning during roll. A further advantage of having a heavier trailing edge part "B" is that it acts as a self-righting feature reducing the risk of the water-craft 200 from capsizing. It will be appreciated that the desired weighting of the wingsail 10 about the axis of rotation 18 may be obtained by weighting the wing in specific locations relative to the axis of rotation 18 and/or by the strategic positioning of the actuators, other heavy components and/or weights in the wingsail 10.

The surface area of the trailing edge part "B" of the wingsail 10 is preferably greater than the surface area of the leading edge part "A" thereof enabling the wingsail 10 to more easily rudder into the wind. Furthermore, it is preferable that the axis of rotation 18 is substantially perpendicular with the water-craft 200.

Figure 3:
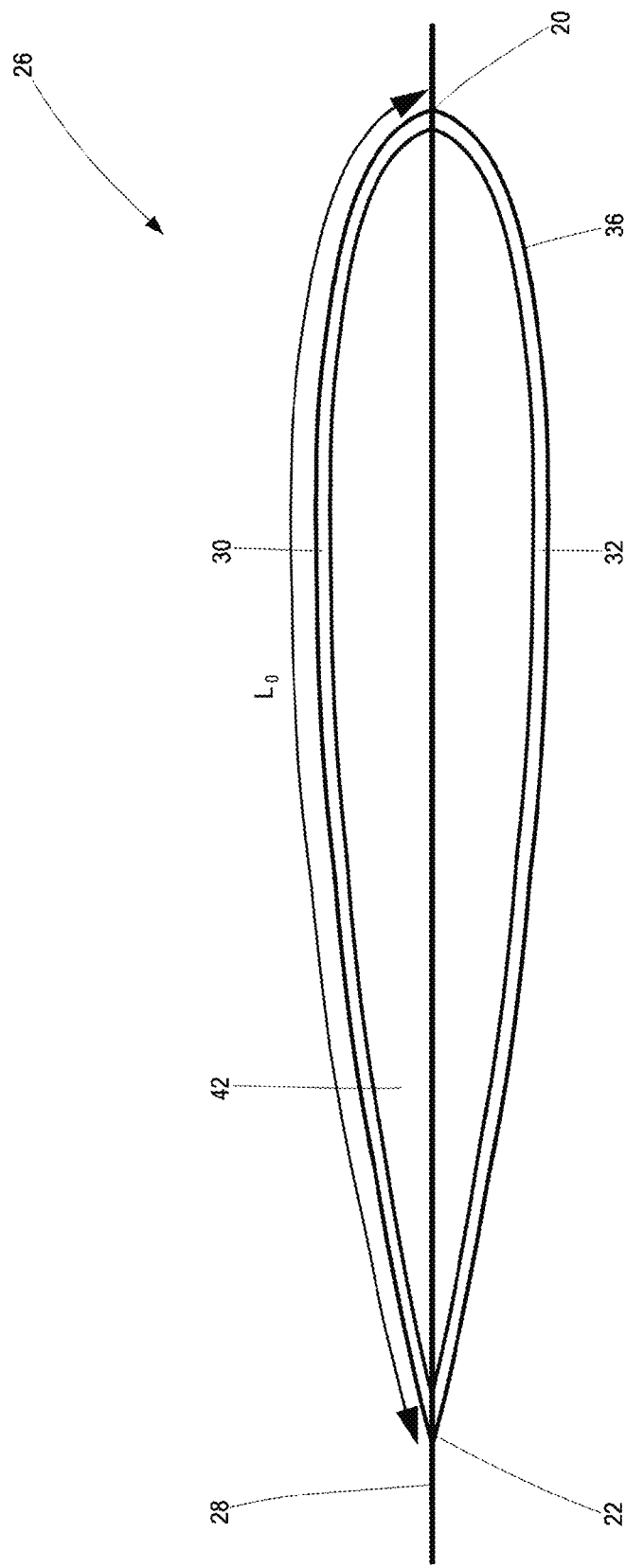
FIG. 3 is a cross-sectional top view of the wingsail of FIG. 2 as viewed along the line A-A in an initial at rest aerofoil section form.

FIG. 3 illustrates a cross section of the wingsail 10 along line A-A of FIG. 1, which cross section is a neutral aerofoil section 26 of the wingsail 10. Although the neutral aerofoil section 26 has been illustrated as being symmetrical about a neutral mean camber line 28 extending through the neutral leading edge 20 and the trailing edge 22 of the wingsail 10, it will be appreciated that for other applications, such as wings for aircraft, the neutral aerofoil section 26 may be asymmetric about the neutral mean camber line 28.

The wingsail 10 includes a first aerofoil segment 30 and a second aerofoil segment 32 meeting at the neutral leading edge 20 and the trailing edge 22 spaced apart relative to one another along their lengths across the neutral mean camber line 28. Reference to the term "mean camber line" will be understood for the purposes of this description as being the locus of points midway between the first and second aerofoil segments 30, 32, which can be variable when the wingsail 10 deforms.

The first and second aerofoil segments 30, 32 may each be formed by one or more aerofoil members connected or fixed to one another end-to-end. Alternatively, as is the case with the preferred embodiment illustrated in the accompanying drawings, the first and second aerofoil segments 30, 32 are integral and opposing first and second members of an elongate aerofoil shell 34.

Regardless of how the wingsail 10, and/or the first and second aerofoil segments 30, 32 are formed, the aerofoil section 26 is preferably a continuous closed loop aerofoil section preventing the ends of the first and second aerofoil segments 30, 32 from sliding relative to one another. Foreseeably, a leading edge form (not shown) and a trailing edge form (not shown) may be used and the aerofoil segments 30, 32 attached to the two forms to form the aerofoil shell 34.

The aerofoil shell 34 is semi-rigid and self-supporting, with the outer surface thereof being a skin 36 over which air in use can flow to create the pressure differences or lift required to propel the water-craft 200.

In other applications and configurations therefor, the skin 36 may be a separate member supported over the first and second aerofoil segments 30, 32 jointly forming aerofoil ribs spaced relative to one another along a wingspan of the wingsail 10. Furthermore, the skin 36 may be made from a fabric material enabling the wingsail 10 to be collapsed by moving the aerofoil ribs against or at least towards one another.

Turning now back to the preferred embodiment of the invention as illustrated in the accompanying figures, the aerofoil shell 34 may be made from a stiff sheet-like material, preferably, metal or steel (i.e. stainless steel), aluminum, wood, composites, foam and/or any combination of the aforementioned. Regardless of the material, the aerofoil segments 30, 32 forming the aerofoil shell 34 should be lightweight, resilient so as bias the wingsail 10 from any deformed aerofoil section shape towards the neutral aerofoil section 26, and have a critical buckling load greater than a compressive load generated in the aerofoil segments 30, 32 by an actuator acting thereon to deform the wingsail from the neutral aerofoil section 26.

For the purposes of this description, critical buckling load will be understood to be the maximum load that a member can withstand before the occurrence of buckling therein, as a function of Young's modulus and the area moment of inertia of the cross-section of such member.

In use, as the wingsail 10 is deformed by actuators, as further discussed below, displacement between any two points on at least one of the aerofoil segments 30, 32, such as the side that undergoes compression, is reduced thereby generating the compressive load in such aerofoil segment 30, 32. The ability of such aerofoil segment 30, 32 to resist the compressive load, together with the closed loop configuration of the aerofoil segments 30, 32 and the inability of their ends to slide past one another, causes such aerofoil segments 30, 32 to adopt a form with a point of inflection, thereby causing the wing to form a reflexed camber aerofoil section 26', as illustrated in FIG. 4 and FIG. 5, which shows the reflexed camber aerofoil section 26' deformed to either side of the neutral mean camber line 28 respectively, and having a substantially sinusoidal deformed mean camber 28'.

The ability of the wingsail 10 to deform into the reflexed camber aerofoil section 26' to either side of the neutral mean camber line 28 provides a fully reversible deformable wingsail 10. The full reversibility enables deformation of the wingsail 10 to one side of the neutral mean camber line 28 to act as forward propulsion to the water-craft 200 and deformation to an opposite side of the neutral mean camber line 28 to act as a brake and/or reverse propulsion, providing the water-craft 200 with significantly increased control as compared to other wind propelled water-craft currently available.

Figure 4:
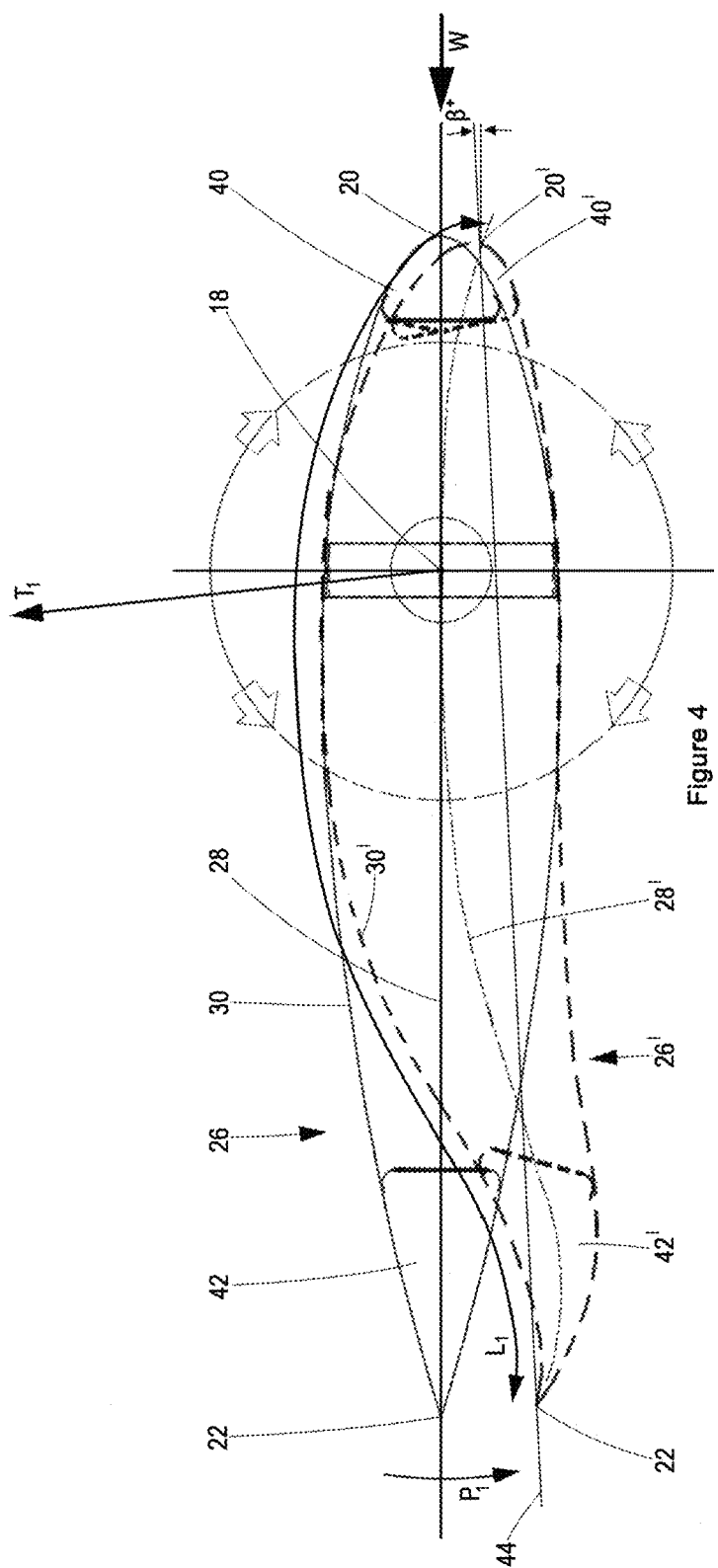
FIG. 4 is a cross-sectional top view of the wingsail of FIG. 3 in a reflexed camber aerofoil section form.
Figure 5:
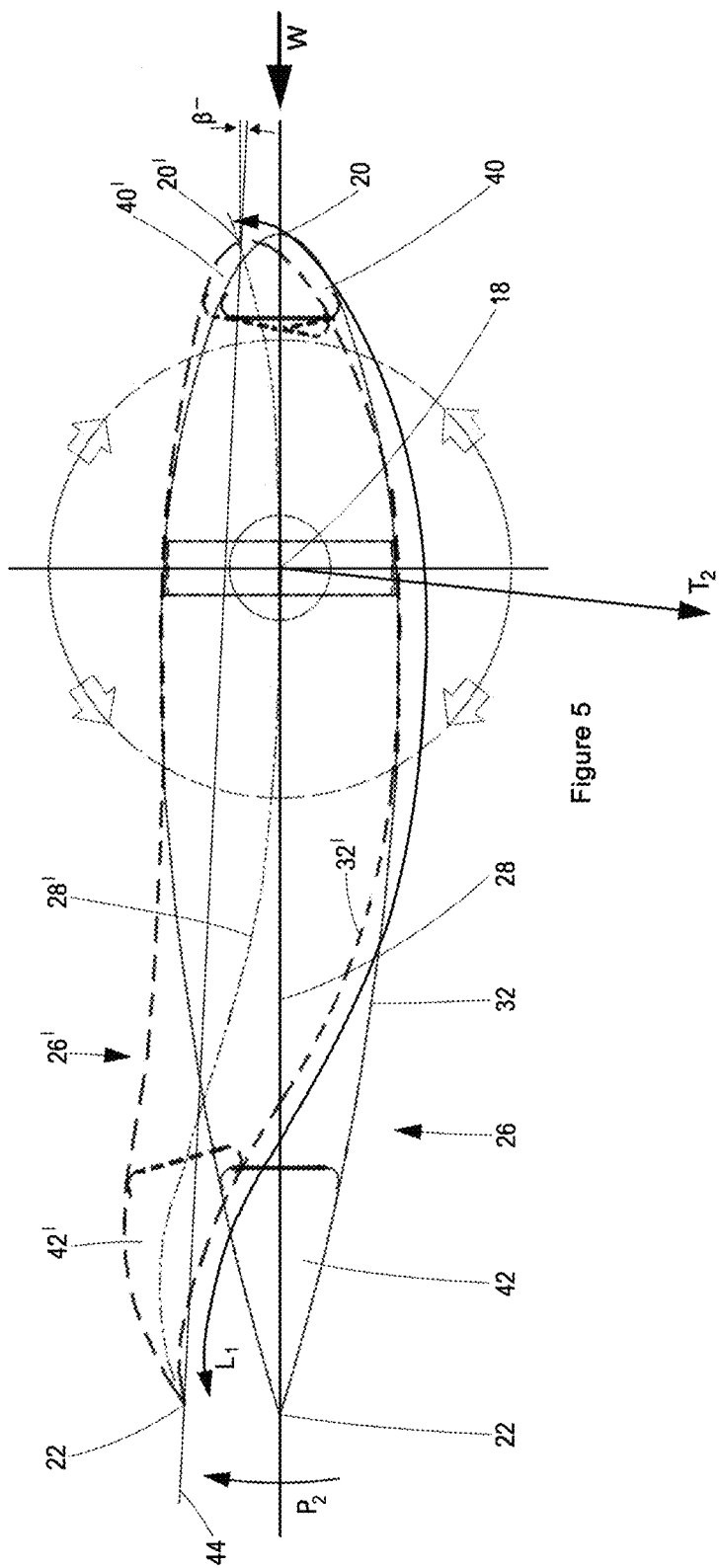
FIG. 5 is a cross-sectional top view of the wingsail of FIG. 3 in, and with respect to the reflexed camber aerofoil section form of the wingsail in FIG. 4, a reversed reflexed camber aerofoil section form.

With reference to FIGS. 3 to 5, it will be appreciated that the ability of the wingsail 10 to deform into the reflexed camber aerofoil section 26' is to a large degree as a result of maintaining the trailing edge 22 common to each aerofoil section throughout the range of deformation thereof, while enabling the leading edge 20 to move or scroll along a nose portion 40 of the aerofoil section 26.

Referring specifically to FIG. 4, as the neutral camber aerofoil section 26 is deformed into the reflexed camber aerofoil section 26', that is reducing two points on the second aerofoil segment 32, the nose portion 40 deforms into a deformed nose portion 40' with a deformed leading edge 20' lying on a reflex mean camber line 28' extending between the new leading edge 20' and the trailing edge 22. In the neutral camber aerofoil section 26, the length of the first aerofoil segment 30 as measured between the neutral leading edge 20 and the trailing edge 22 is a first length $L_o$, while in the reflexed camber aerofoil section 26', the length of the first aerofoil segment 30' as measured between the deformed leading edge 20' and the trailing edge 22 is a longer second length $L_1$.

The critical buckling load characteristics of the aerofoil segments 30, 32 and their configuration in a continuous closed loop to form the aerofoil shell 34 means that the aerofoil section in any deformed shape will substantially maintain a constant aerofoil section perimeter length. As a result, an increase in the length of the first aerofoil segment 30 from the first length $L_o$ to the second length $L_1$ in an aerofoil section having a substantially constant aerofoil section perimeter length must result in a shortening in length of the second aerofoil segment 32. The changing of the individual lengths of the first and second aerofoil segments 30, 32 is resisted by the trailing edge 22, creating a push/pull effect thereon and causing the trailing edge 22 and/or a tail portion 42,42' of the wingsail 10, being free to move across the neutral camber line 28, to "kick" into the reflexed camber aerofoil section 26'.

In use, in a wind having a prevailing direction W, the deformed tail 42' (FIG. 4) of the reflexed camber aerofoil section 26' causes the reflexed camber aerofoil section 26' to pivot in direction $P_1$ about the axis of rotation 18. The angle $\beta^+$ defined between the prevailing wind direction W and a deformed chord 44 passing through the deformed leading edge 20' and the trailing edge 22 represents the angle of attack of the wingsail 10. With the wingsail 10 being freely rotatable about the axis of rotation 18, the wingsail 10 is capable of automatically setting its own angle of attack $\beta^+$ and generating a first lifting force $T_1$ directed in a first direction relative to the neutral mean camber line 28.

FIG. 5 illustrates the reversibility of the wingsail 10. Deformation of the wingsail 10 by now increasing the length $L_1$ of the second aerofoil section 32 instead of the first aerofoil section 30 causes the wingsail 10, in a manner substantially the same as explained with reference to FIG. 4, to adopt the reflexed camber aerofoil section 26', this time with the deformed tail 42' of the reflexed camber aerofoil section 26' forcing the reflexed camber aerofoil section 26' to pivot in direction $P_2$ about the axis of rotation 18 and automatically setting an angle of attack $\beta^-$. As a result, the wingsail 10 is capable of generating a second lifting force $T_2$ directed in a second opposite direction relative to the neutral mean camber line 28 and the first lifting force $T_1$.

The opposing first and second lifting forces $T_1, T_2$ enable the water-craft 200 to be propelled in one direction, and braked and/or reversed in an opposite direction providing much more control of the water-craft 200 as compare to existing counterpart water-crafts. To promote lift, the aerofoil segment 30, 32 of the wingsail 10 opposite the side to which the lifting forces $T_1, T_2$ are generated curves inwardly toward the reflexed camber line 28' forming an under cambered lifting aerofoil section. Although the concave under cambering is illustrated as coming about only in the event of the wingsail 10 being deformed into the reflexed camber aerofoil section 26', it may in fact occur otherwise than in the reflexed camber aerofoil section 26'. For example, in the application of wings for aircraft, the aerofoil section might define an under cambering in its neutral form.

To further promote lift, the thickness and/or material properties of certain predefined portions of the aerofoil segments 30, 32 (and/or the aerofoil shell 34 formed therefrom) may vary from the remaining portions thereof so as to promote a greater or lesser degree of deformation in these predefined portions as compared to the remaining portions. This enables controlled or predefined deformation of the wingsail 10. Preferably, at least the nose portion 40, 40' of the wingsail 10 is made from a thinner or less stiff material than the remaining portions of the wingsail 10 so as to promote a greater degree of deformation in the nose portion 40, 40'.

It will be appreciated that the neutral aerofoil section 26 may be deformed therefrom and toward the reflexed camber aerofoil section 26' as described above, i.e. by varying the displacement of points on the aerofoil section, in many different ways and with many different actuator configurations.

Figure 15:
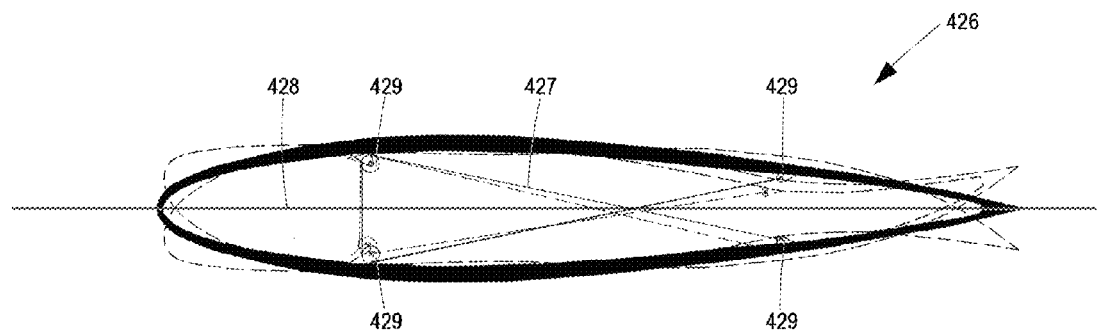
FIG. 15-18 are cross-sectional views of the wing, in the form of a wingsail or otherwise, showing examples of actuator or actuator set-up variants.

In one example, with like reference numerals designating like parts, FIG. 15 illustrates the cross section of the neutral aerofoil section 426 having actuators in the form of cables 427 running over pulleys for displacing actuation points 429 relative to one another to deform the wingsail from the neutral aerofoil section 426.

Figure 16:
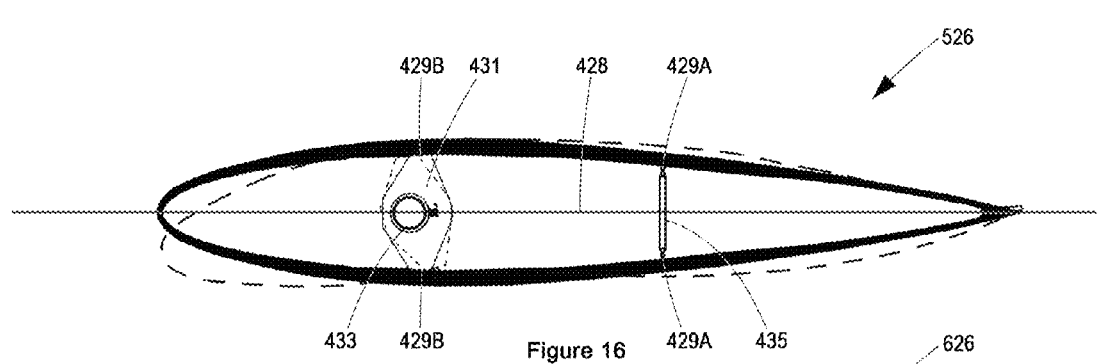

In a second example, FIG. 16 illustrates the cross section of the neutral aerofoil section 526 having actuators in the form of spar or a lever arm 431 rotatably mounted on a mast tube 433, together with one or more cross brace struts 435 extending transversely across the neutral camber line 428 between actuation points 429A. The lever arm 431 comprises formations for displacing actuation points 429B relative to actuation point 429A to deform the wingsail from the neutral aerofoil section 426.

Figure 17:
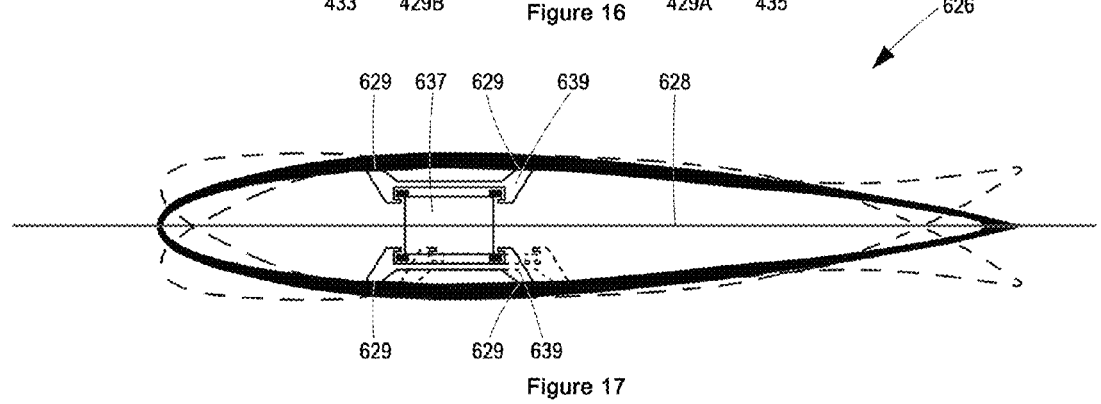

In a third example, FIG. 17 illustrates the cross section of the neutral aerofoil section 626 having actuators in the form of a spar or mast 637 with one or more sliding plates 639 having first sides being slidable relative to outer sides of the spar or mast 637 and second sides having formations for displacing the actuation points 629 to deform the wingsail from the neutral aerofoil section 426.

Figure 18:
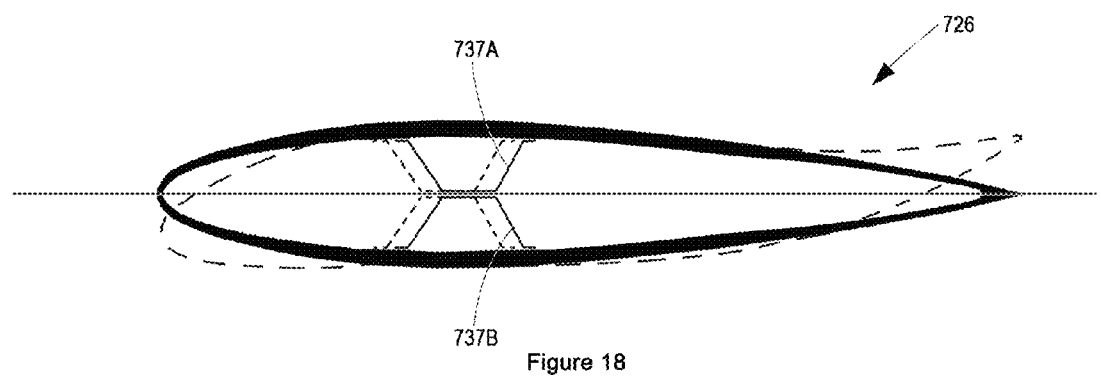

In a fourth example, FIG. 18 illustrates the cross section of the neutral aerofoil section 726 having actuators in the form of a spar or mast split longitudinally into split spar or mast halves 737A, 737B, the split halves having first sides being slidable relative to one another on a plane substantially co-planar with the neutral camber line and second sides having formations for displacing the actuation points to deform the wingsail from the neutral aerofoil section 726.

Figure 6:
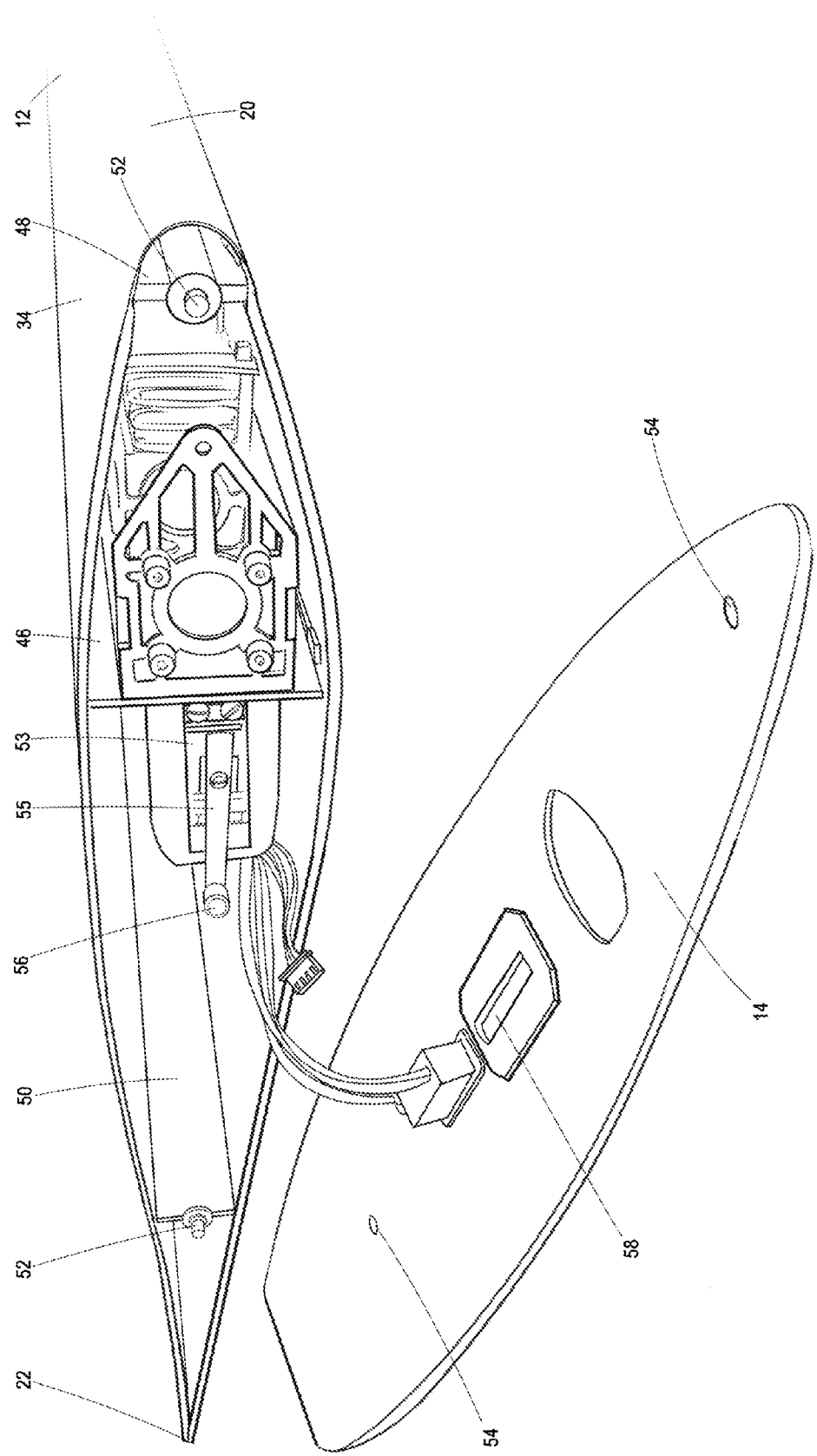
FIG. 6 is a perspective view of the wingsail, showing at least some of the internal components of one preferred example of actuator set up viewed from a operatively bottom end.

In one example, the wingsail 10 includes a main spar 46, a leading edge spar 48 and a trailing edge spar 50 (FIG. 6). The main spar 46 may be abuttable with, but is preferably connected along opposite sides to the aerofoil segments 30, 32 and across the neutral mean camber line 28 so as to be located interiorly within the aerofoil shell 34 and at or near a location of maximum thickness of the neutral aerofoil section 26.

The leading edge spar 48 may too be abuttable with, but is preferably connected along opposite sides to the aerofoil segments 30, 32 and across the neutral mean camber line 28 so as to be located interiorly within the aerofoil shell 34 and between the leading edge 20 and the main spar 46.

The trailing edge spar 50 may further be abuttable with, but is preferably connected along opposite sides to the aerofoil segments 30, 32 and across the neutral mean camber line 28 so as to be located interiorly within the aerofoil shell 34 and between the trailing edge 22 and the main spar 46. Each of the spars 46, 48, 50 extend substantially the length of the wingspan of the wingsail 10 and are connected flexibly or hingedly with the aerofoil segments 30, 32.

The leading edge and trailing edge spars 48, 50 are rotatably supported at their respective ends on pins 52 receivable within corresponding locating apertures 54 on the first and second end plates 12, 14. As such, the leading edge and trailing edge spars 48, 50 are, relative to the first and second end plates 12, 14, restricted from longitudinal and/or lateral movement, but free to rotate about central axes passing through each of the leading edge and trailing edge spars 48, 50 respectively.

The main spar 46 is supported by and within the aerofoil shell 34 of the wingsail 10 such that the main spar remains unfixed and effectively floating with respect to the first and second end plates 12, 14. Connected to each end of the main spar 46 is an actuator 53. Each actuator comprises an actuator arm 55 with a free end 56 receivable within an actuating guide formation in the form of a guide slot 58 defined in each of the first and second end plates 12, 14.

In use, the actuator arm 55 is controllable by the actuator 53 to pivot to either side of the neutral camber line 28, causing the free end 56 of the actuator arm 55 to abut and ride along the guide slot 58 defined in each of the first and second end plates 12, 14. With the actuator 53 connected to the main spar 46, the force generated by abutment of the actuator's free end 56 with the guide slot 58 is translated into a substantially lateral movement of the main spar 46 relative to the first and second end plates 12, 14. It will be appreciated that the movement of the main spar 46 may also be described as being substantially transverse the neutral camber line 28.

Transverse movement of the main spar 46 relative to the neutral camber line 28 moves the line of contact between the main spar 46 and the aerofoil shell 34 in a first substantially transverse direction relative to the neutral camber line 28. The leading and trailing edge spars 48, 50, being pinned to the first and second end plates 12, 14 and allowed only to rotate relative thereto, resist the transverse movement of the main spar 46 in a second substantially opposite transverse direction to the first transverse direction along lines of contact between the aerofoil shell 34 and the leading and trailing edge spars 48, 50 respectively.

It will be appreciated that as a result of the movement of the spars 46, 48, 50 relative to one another, at least the points/lines of contact between the spars 46, 48, 50 and aerofoil shell 34 are displaceable relative to each other thereby to deform the neutral aerofoil section 26 into the reflexed camber aerofoil section 26'. On deactivation of the actuator 53, the actuator's free end 56 is returned to a central neutral position in the guide slot 58, thereby enabling the wingsail 10 to return resiliently to its neutral aerofoil section 26.

In one example, the actuator or actuators, such as one of the spars, are energized to deflect the aerofoil shell 34, which transforms the neutral camber line 28 into a reflexed camber line 28'. The reflexed aerofoil shell, with the particular reflexed configuration caused by the one or more spars, automatically rotates about the axis of rotation 18 to set its own angle of attack.

It will be appreciated further that the manner of deforming the wingsail 10 described in detail here-before is simple requiring at most only 8 major components namely: the aerofoil shell 34; the three spars 46, 48, 50; the two end plates 12, 14; and the two actuators 53. It is envisaged that the number of major components can be further reduced by eliminating at least one of the spars and one of the actuators.

The locations of the leading and trailing edge spars 48, 50 relative to the leading and trailing edges 20, 22 of the wingsail 10 can impact on the shape of the deformed shape of the aerofoil sections. Preferably, the leading edge spar 48 is located significantly close to the leading edge 20 than to the main spar 46. The trailing edge spar 50 is preferably also located closer to the trailing edge 22 than to the main spar 46, but not quite as close as the leading edge spar 48 with the leading edge 20. Most preferably, the trailing edge spar 50 is located a third of the distance back from the trailing edge 22 towards the main spar 46 along the neutral camber line 28.

With reference now specifically to FIG. 2, the wingsail 10 includes an extension panel 60 tapering from the operatively lower second endplate 14 end of the wingsail 10 towards the operatively upper first endplate 12 end thereof. In other words, the chord length between the leading and trailing edges 20, 22 of the neutral aerofoil section 26 is shorter at the operatively upper first endplate 12 end of the wingsail 10 as compared to the chord length at the operatively lower second endplate 14 end thereof.

The extension panel 60 is a means of providing the wingsail 10 with a more pronounced reflexed camber aerofoil section 26', thereby assisting the wingsail 10 rudder about the axis of rotation 18 between larger angles of attack β. Furthermore, the extension panel 60 is either fixed to, or movably extendible and/or retractable with respect to the wingsail 10 such that the surface area of the wingsail 10 is variable.

Figure 22:
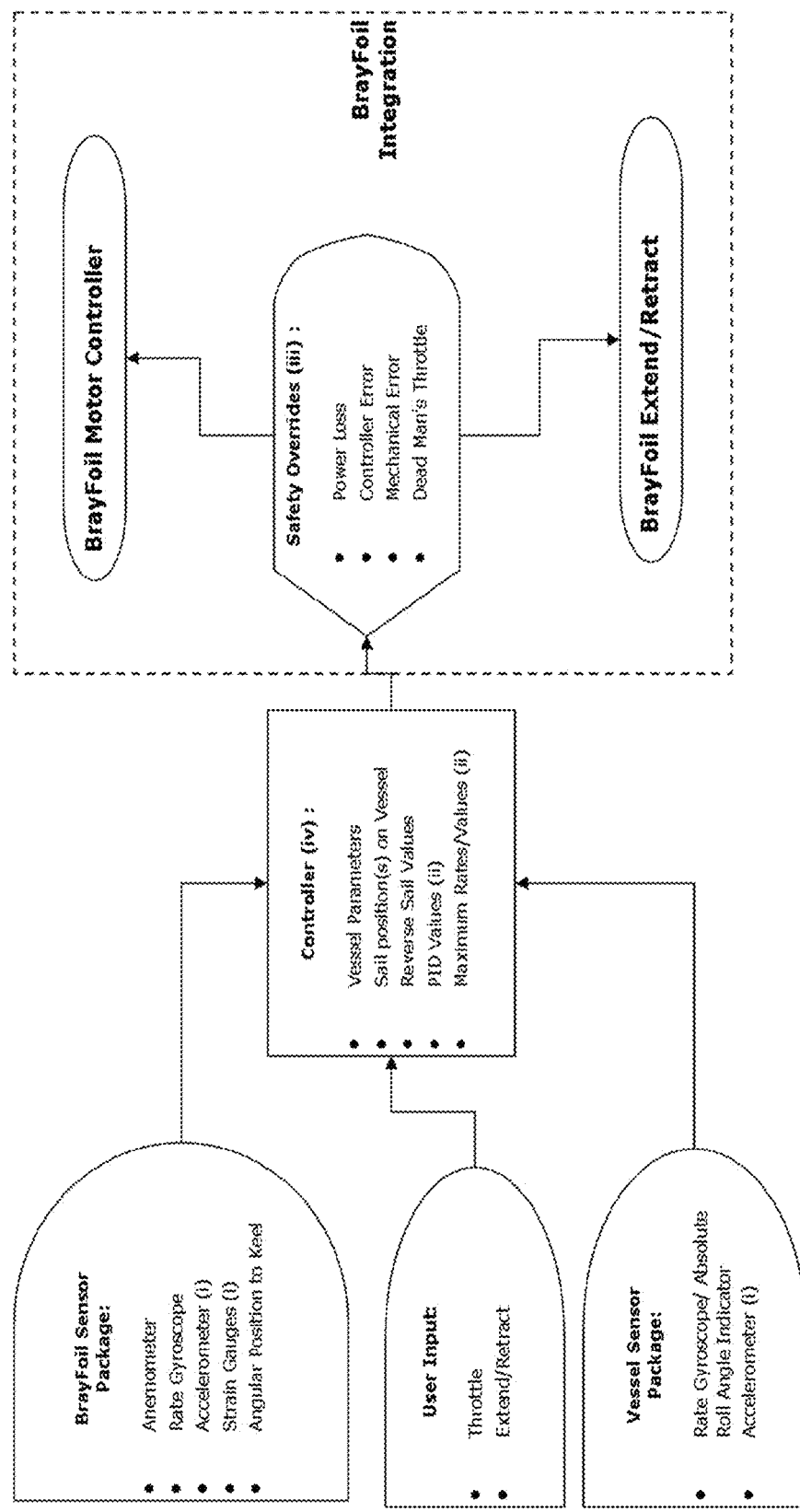
FIG. 22 is a schematic view of a control system for a wing, in the form of a wingsail or otherwise.

The actuators 53 and the amount by which they are capable of deforming the wingsail 10 are controlled by some form of control systems, a schematic of one such control system being illustrated in FIG. 22. The control system may include a plurality of sensor and user inputs, software and a plurality of outputs.

The sensor inputs are sourced from a one or more anemometers (for measuring fluid speed and/or direction), fluid-driven turbine, gyroscopes, accelerometers, strain gauges, pressure sensors, position sensors and/or inclinometers.

The user inputs are throttle inputs (i.e. control of the deformation of the wingsail via the actuators), extending and/or retracting inputs (i.e. in the case of the collapsible wingsail), steering inputs (typically through rudder control) and/or kill switch inputs.

The software is one or more of databases, protocols and/or programmes against which the sensor and user inputs are interrogated, the control system then outputting a corresponding output to control the wingsail in the appropriate manner (i.e. actuating the actuators to deform the wingsail to a particular reflex camber aerofoil section).

Built into the control system (or as a stand alone unit), the wingsail 10 is further controllable by a stall prevention protocol. It is envisaged that the stall prevention system includes a database uploaded with information obtained through testing relating to prevailing wind speeds and corresponding allowable degrees of aerofoil section deformation that will prevent the aerofoil section from deforming into an aerofoil section that will automatically set an angle of attack causing stall at that particular wind speed.

In use, the prevailing wind speed is measured by a measuring means, for example in the form of a miniature wind turbine, and inputted into the database. The database is then interrogated with the wind speed value so as to identify the correspondingly allowable degree of aerofoil section deformation. The allowable degree of aerofoil section deformation, in the form of some signal, is outputted to the actuator to deform the wingsail 10 by no more than the allowable degree of aerofoil section deformation. The speed measuring wind turbine may double up as a power generation device for powering electrical systems aboard the water-craft 200 and/or to charge batteries for later use.

Figure 7:
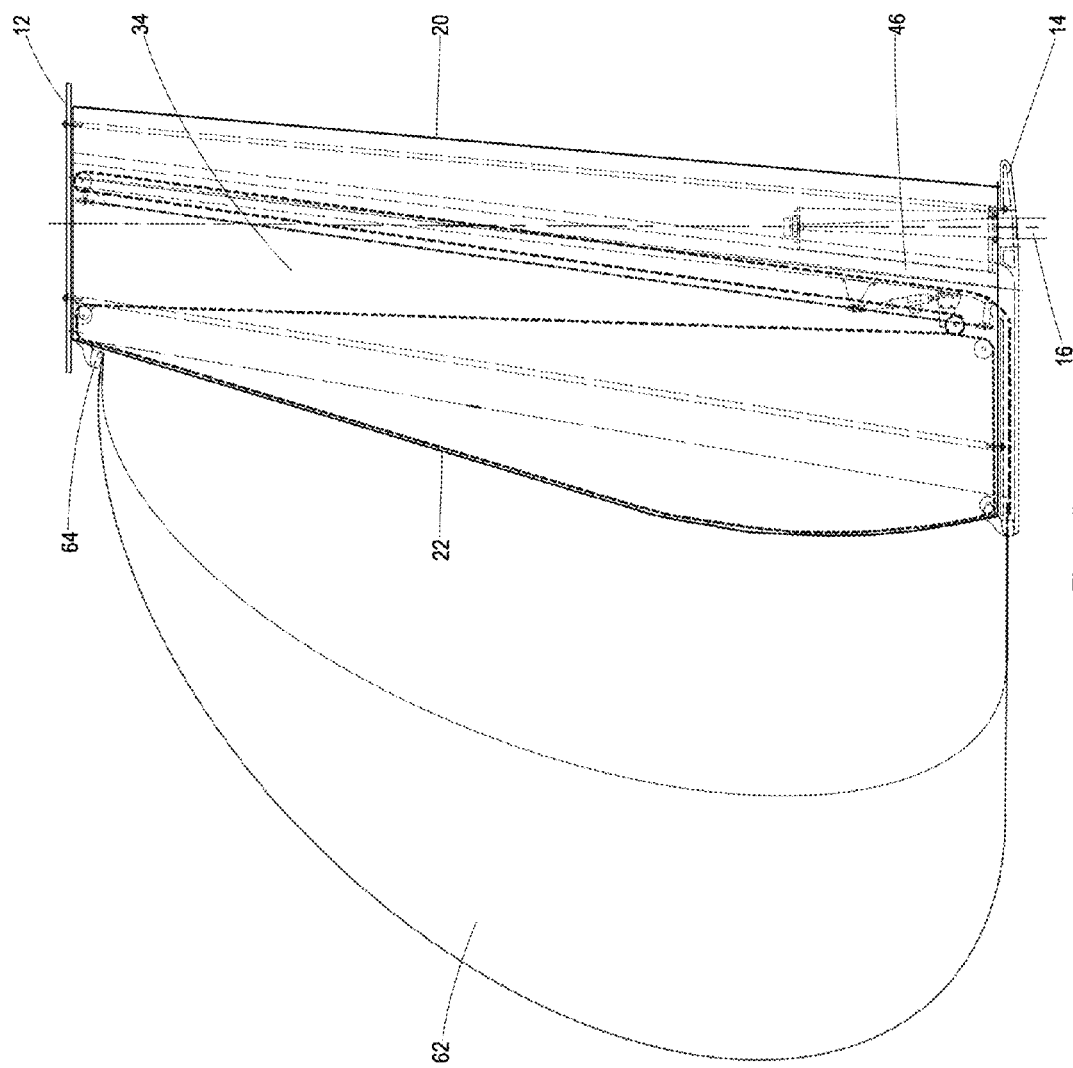
FIG. 7 is a side view of an alternative embodiment of the wingsail incorporating a retractable and deployable spinnaker.
Figure 8:
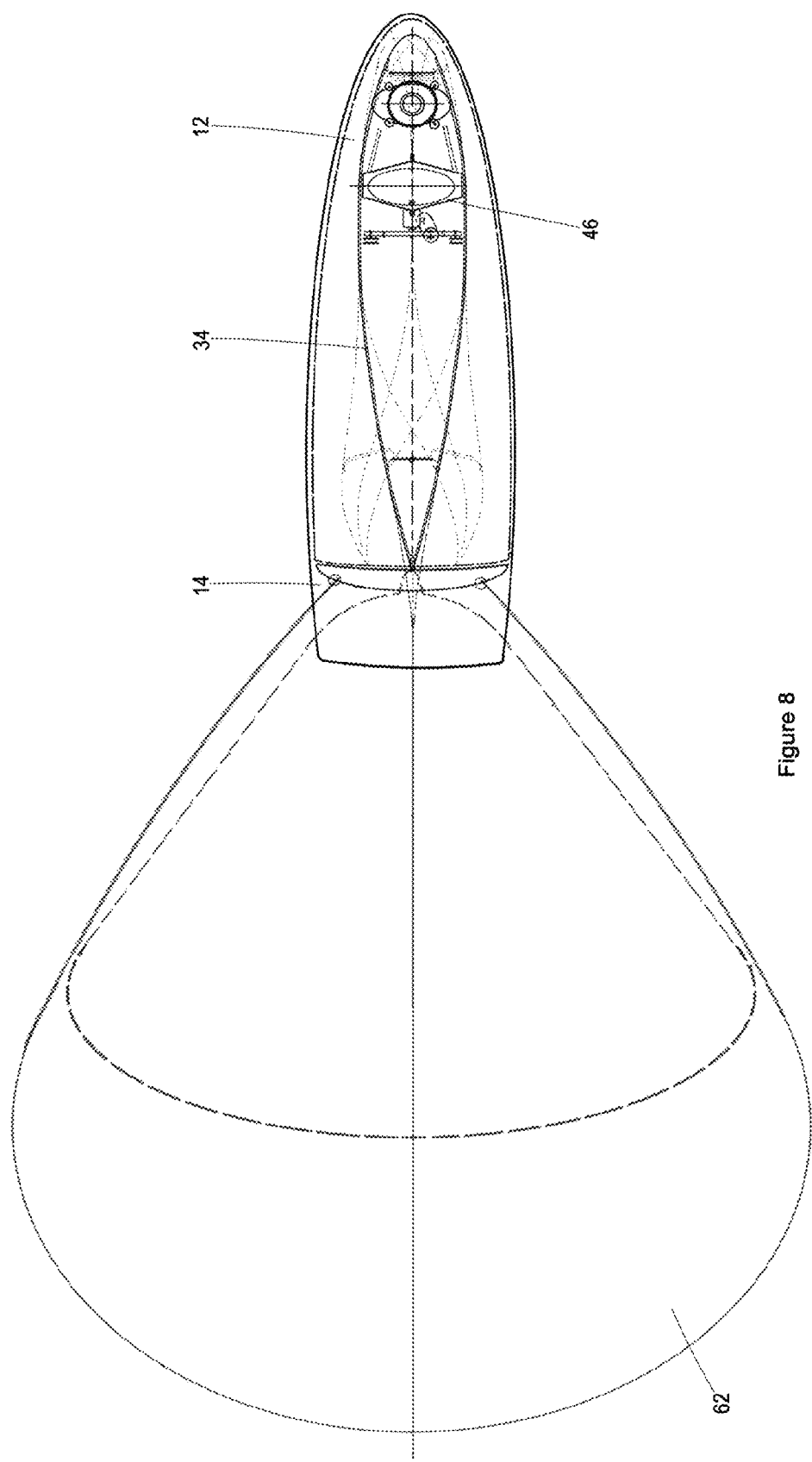
FIG. 8 is a top view of an alternative embodiment of the wingsail of FIG. 7.
Figure 9:
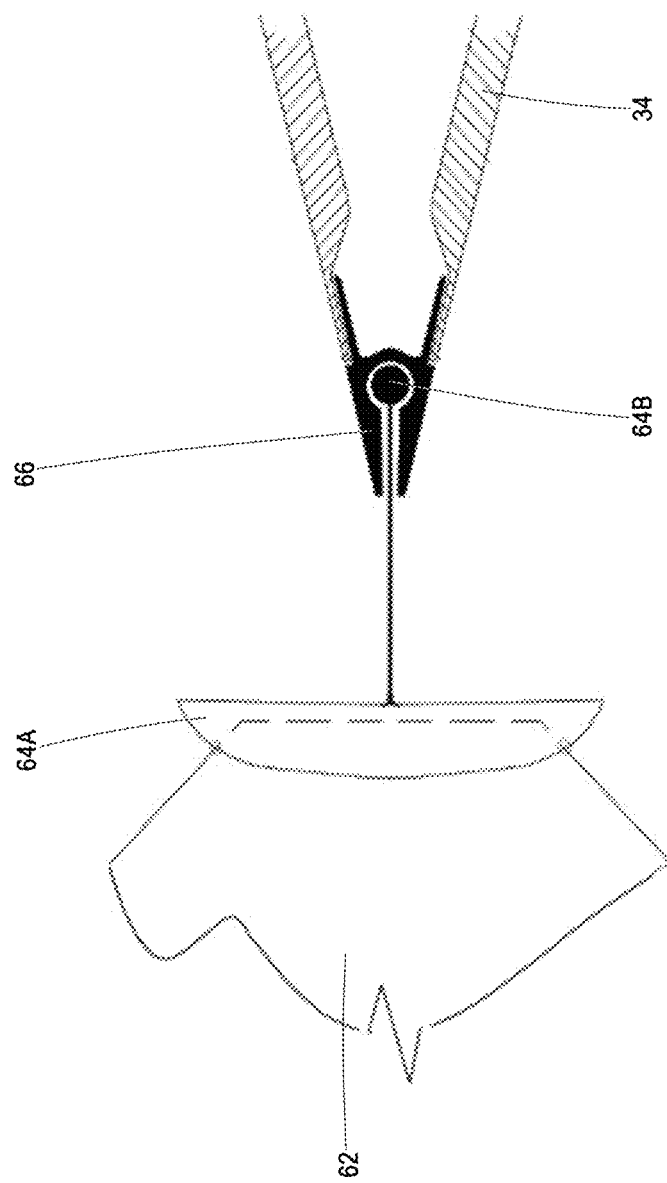
FIG. 9 is a zoomed-in top view of trailing edge of the wingsail of FIG. 8, showing a track on the trailing edge of the wingsail along which a runner of the spinnaker is capable of riding between its retracted and deployed positions.

For sailing directly downwind, it is useful for the wingsail 10 to include a deployable spinnaker 62 (FIG. 7). The spinnaker 62 may be stowable in a hollow portion of the main spar 46 and deployable therefrom by a runner 64 connected at one end 64A to the spinnaker 62 and captured at an opposite end 64B in a track 66 running along the trailing edge 22 of the wingsail 10 (FIG. 9). The runner 64 is movable operatively upwardly along the track 66 from the operatively lower second endplate 14 end of the wingsail 10 towards the operatively upper first endplate 12 end thereof thereby to pull the spinnaker from its stowed position within the main spar 46 into is fully deployed position. It will be appreciated that when not required, the spinnaker 62 is returnable to the stowed position within the main spar 46 by reversing the operation of deployment.

A cable system may be used to pull the spinnaker 62 into the stowed and/or deployed positions. Furthermore, it is envisaged that the spinnaker 62 is deployable automatically by a deployment actuator (not shown) triggerable by a wind direction sensor (not shown).

Figure 10:
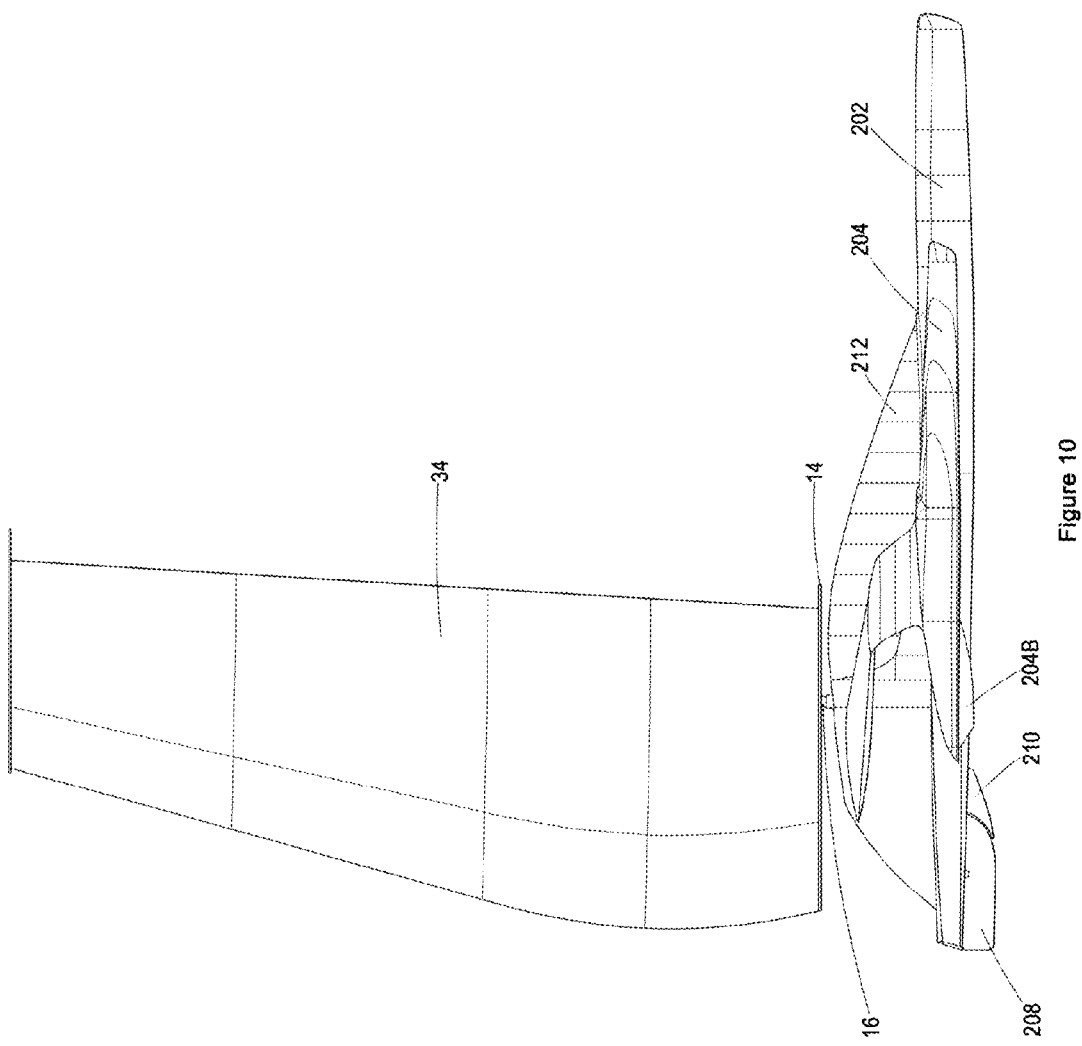
FIG. 10 is a side view of the wingsail and water-craft of FIG. 1.
Figure 11:
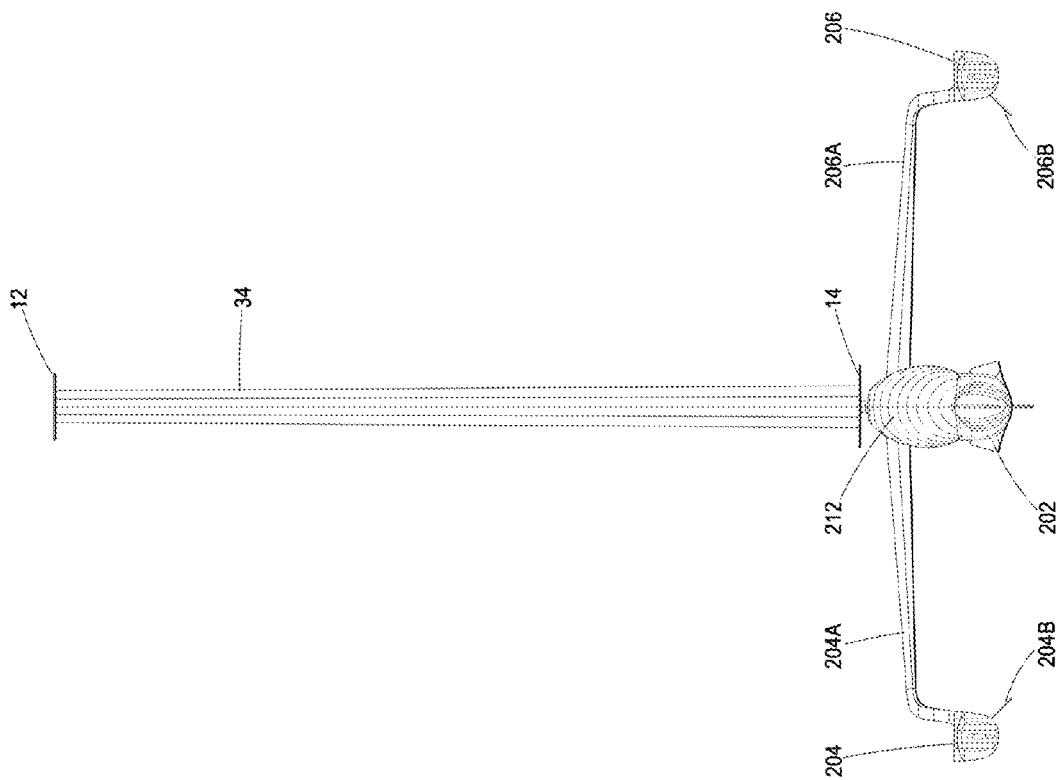
FIG. 11 is a front view of the wingsail and water-craft of FIG. 1.

With reference now to FIG. 1, FIG. 10 and FIG. 11, a water-craft 200 embodying a single-seater tri-maran style water-craft having a main hull 202 flanked on either side by outriggers 204, 206 is shown. The outriggers 204, 206 are connected to the main hull by connecting members 204A, 206A, which connecting members 204A, 206A are releasably connectible to the main hull 202 enabling the water-craft 200 to be collapsed into a compact form for storage and/or transportation. To further enhance the water-craft's compactability, it will be appreciated that the wingsail 10 is also detachably mounted on the water-craft 200.

The main hull 202 includes a rudder 208 for direction control of the water-craft 200. The rudder 208 for the purposes of improved stability and control is pivotal relative to the main hull 202 about an axis located operatively ahead of its mid-point and protected from impact damage and possible entanglement with debris or aquatic life by a guard skeg 210. Skegs 204B, 206B (FIG. 11) also extend operatively downwardly from each of the outriggers, angled towards the main hull 202 for further improved stability and control, and to enable high speed cornering. It will be appreciated that the water-craft 200 and all of its appendages are shallow draft enabling the water-craft 200 to operate in shallow waters, particularly over coral reefs which are sensitive to damage.

For the purposes of safety, a number of safety features have been incorporated into the water-craft 200. The first is a floatation means (not shown) located in the wingsail 10 for preventing the water-craft 200 from fully rolling over in the event of capsizing. The second is a windshield 212 covered cockpit, providing the ability to waterproof the cockpit and prevent a pilot from drowning in the event of the water-craft 200 capsizing. Practically, being constrained in movement in the vertical direction by the overhanging endplate 14, the windshield 212 is slidable operatively forwardly and backwardly to provide the pilot with access to the cockpit.

The third safety feature is a pressure sensor (not shown) located beneath the seat of the pilot. Without the weight of the pilot being sensed by the pressure sensor, or at least a predetermined minimum weight, the actuators 53 are inoperable to deform the wingsail 10. The fourth safety feature is the inclusion of a kill switch (not shown) triggerable by the pilot at any time to immediately deactivate the actuators 53, enabling the wingsail 10 to resiliently revert to the neutral aerofoil section 26 and bring the water-craft 200 to quick and safe stop.

It is important that the control of the water-craft 200 remain as easy as possible, thereby enabling even persons with little to no previous sailing experience to confidently operate the water-craft 200. As such, it is envisaged that the water-craft 200 will comprise two main controls, namely a forward-reverse control and a directional steering control.

The forward-reverse control controls the degree to which the actuators 53 deform the wingsail 10 to generate a lift force to propel the water-craft 200 forwardly. Alternatively, the forward-reverse control can deform the wingsail 10 to generate a lift force in a direction opposite to the lift force generated to propel the water-craft 200 forwardly, thereby acting as a brake and eventually reversing the water-craft 200. The directional steering control simply operates the rudder 208 enabling the pilot to direct the water-craft 200 to the left or to the right.

During sailing, the wingsail 10 is free to rotate about the axis of rotation 18 relative to the water-craft 200. As the water-craft 200 changes direction during sailing, the wingsail 10 is free to swing across a keel line of the water-craft 200 such that the trailing edge 22 moves from one side of the keel line to another. Reference to the term keel line will be understood to refer to the longitudinal centerline of the main hull 202 running from bow to stern. The wingsail 10 can also rotate about the axis of rotation by changing the actuators to increase or decrease the deflection of the camber line while maintaining the direction of the water-craft.

As a result, the reflexed camber aerofoil section 26' previously propelling the water-craft 200 in a forward direction would, without the inclusion of a means to automatically reverse the forward-reverse control, immediately act to brake and/or reverse the water-craft 200 as the trailing edge 22 moves from one side of the keel line to the other, even with the pilot maintaining the forward-reverse control in the forward direction.

The inclusion into the water-craft 200 of the means (not shown) for automatically reversing the forward-reverse control, in the event of the trailing edge 22 crossing over the keel line, deforms of the wingsail 10 to the exact reverse reflexed camber aerofoil section 26' previously propelling the water-craft 200 in the forward direction, thereby continuing to propel the water-craft 200 forwardly without any input, or knowledge of the change in aerofoil section, by the pilot.

The means (not shown) for automatically reversing the forward-reverse control may be achieved in many different ways, for example, by magnetic sensors, optical sensors or mechanical commutator type devices (as hereafter described), generally having the ability to switch the polarity of the forward-reverse control.

Figure 14:
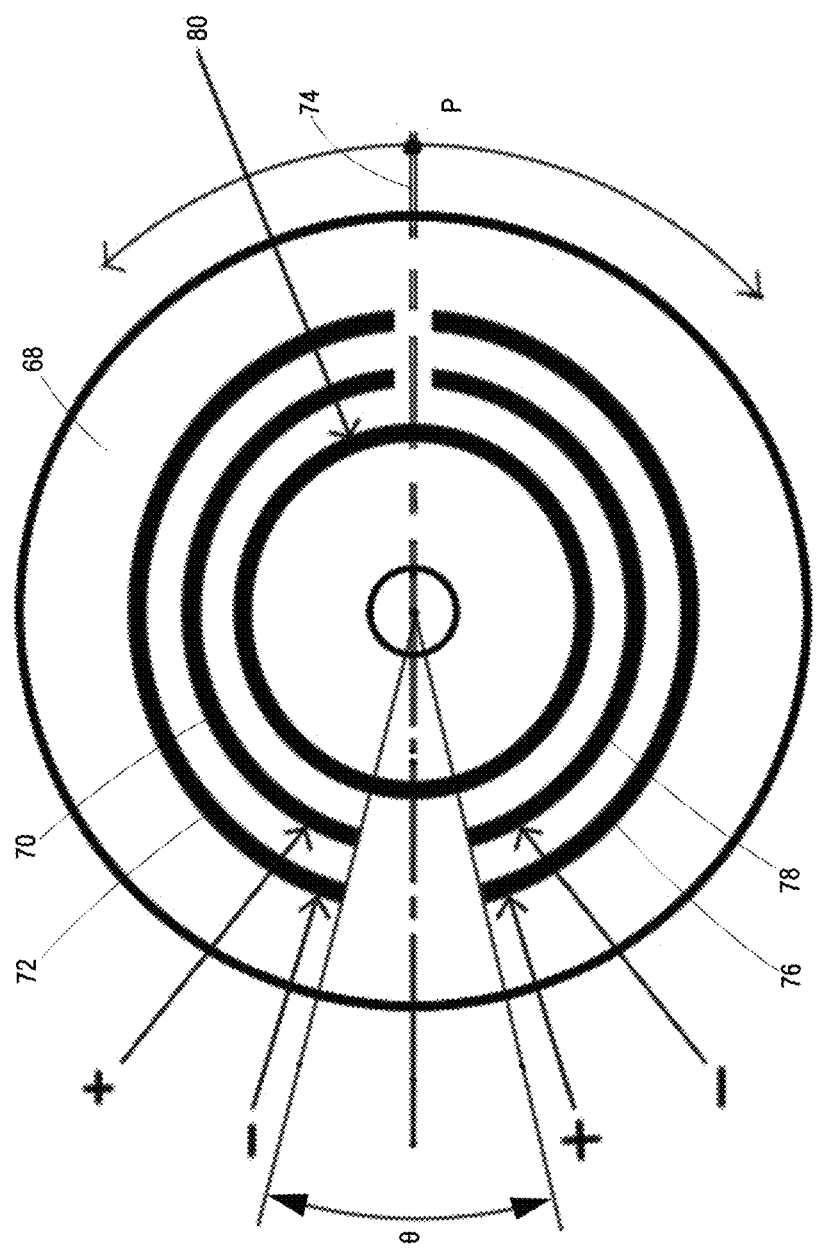
FIG. 14 is a schematic view of a contact plate of a forward-reverse control means for automatically reversing the deformation of the wingsail.

In the mechanical commutator type embodiment of the forward-reverse control, and with reference now to FIG. 14, it is envisaged that the forward-reverse control includes a contact plate 68 having first positive and negative arc tracks 70, 72 on a first side of a representative keel line 74 and second positive and negative arc tracks 76,78 on a second opposite side of the representative keel line 74 concentrically arranged about a circular earth track 80. On the first side of a representative keel line 74, circular earth track 80 is directly flanked by the first positive arc track 70, while on the second side of a representative keel line 74, circular earth track 80 is directly flanked by the second negative arc track 78.

In this manner, contacts (not shown) configured to ride on the tracks 70, 72; 76, 78 in a predetermined circular path about the axis of rotation 18 pass between the positive and negative tracks 70, 72; 76, 78, having the effect of switching the polarity to the actuators 53, resulting in a reversal of the deformation applied to the wingsail 10. The contacts may be located on the wingsail 10 or the water-craft 200, with the contact plate 68 being located on the other of the wingsail 10 or the water-craft 200. Practically, the optimal position for the contacts and contact plate 68 are about the mast 16.

In this manner, a forward control by the pilot will continue to cause the water-craft 200 to be propelled in a forward direction regardless of the position "P" of the wingsail 10 about the axis of rotation 18. There is a band of critical angles □ of the wingsail 10 relative to the representative keel line 74 where the aerofoil section of the wingsail 10 is actuated or resiliently returned to the symmetrical neutral aerofoil section to avoid the drag on the wingsail 10 from becoming substantially the same or greater than the lift force generated by the wingsail 10.

Although the invention has been described above with reference to preferred embodiments, it will be appreciated that many modifications or variations of the invention are possible without departing from the spirit or scope of the invention.

For example, the leading and trailing edge spars 48, 50 may be supported by the aerofoil shell 34 and floating with respect to the endplates 12, 14 such that the leading and trailing edge spars 48, 50 are transversely movable by the actuators 53 across the neutral camber line 28 with the main spar 46 being rotatably pinned to the endplates 12, 14.

Another example is that wingsail 10 has an initial at rest aerofoil section being that section the wingsail 10 is inherently biased toward on the removal of forces from the actuators. The initial at rest aerofoil section may be the neutral aerofoil section, the reflexed camber aerofoil section or any incremental aerofoil section therebetween.

Figure 12:
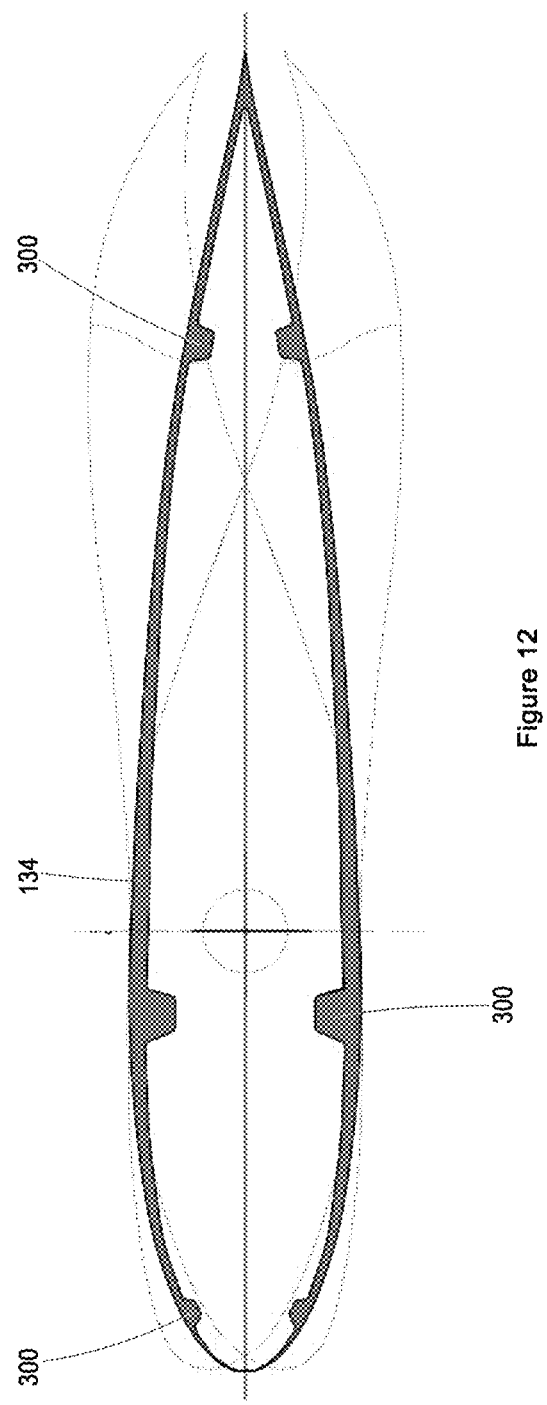
FIG. 12 is a cross-sectional top view of yet another alternative embodiment of the wingsail.

Yet another example, is using telescoping rams or cables connected between key points on the aerofoil shell 34 and/or the endplates 12, 14 to displace the key points relative to one another for the purposes of deforming the wingsail 10. With reference to FIG. 12, the aerofoil shell 134 includes thickened portions 300 extending partially or fully the length of the wingspan of the wingsail 10 to which the actuated deformation mechanisms are connectible. The thickened portions enable the deformation of long lengths of the aerofoil shell 134 by means of fewer actuation fixing points.

Figure 19:
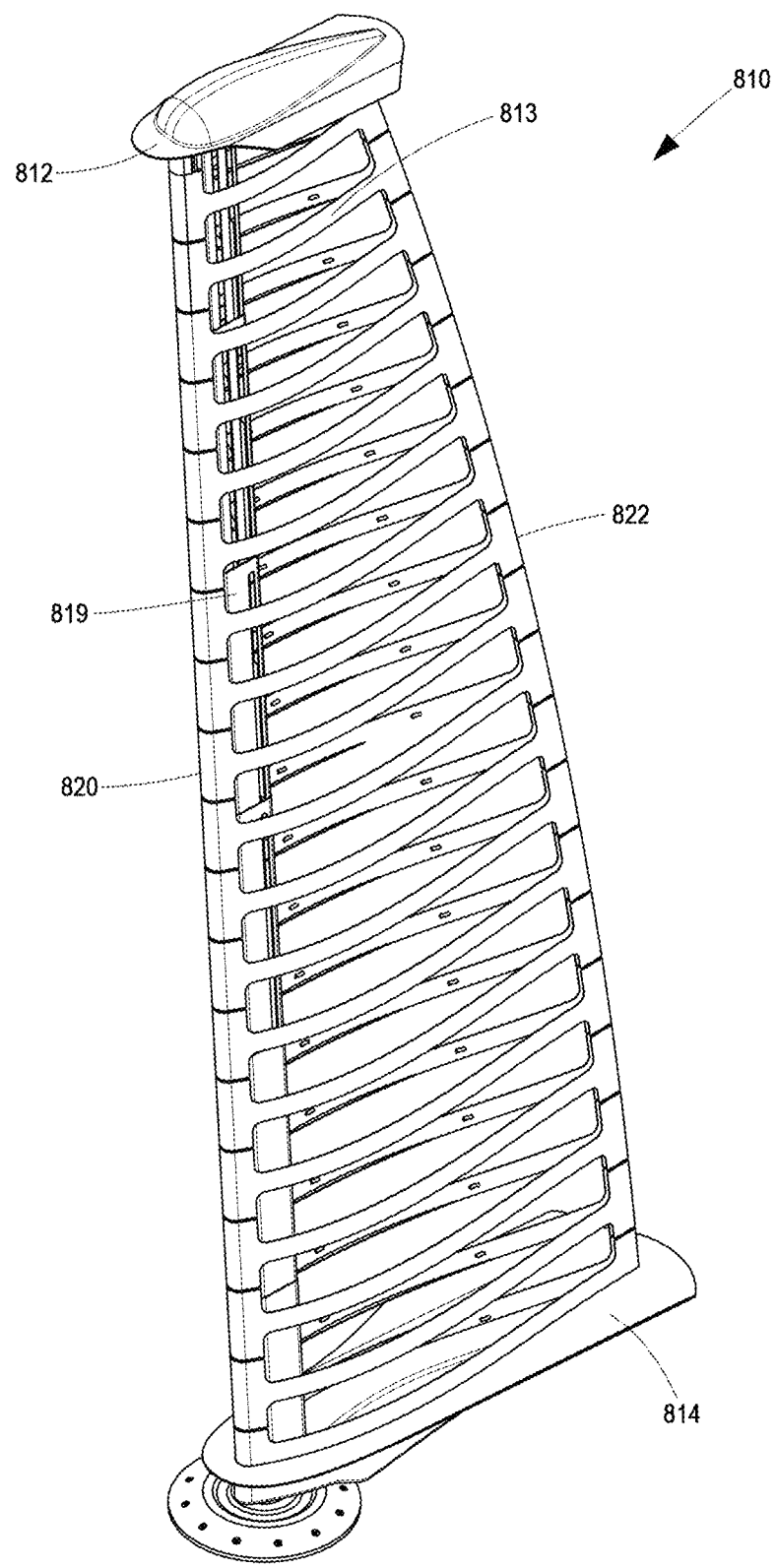
FIG. 19 is a perspective view of a collapsible wingsail in accordance with an aspect of the present invention in an erected position.

Another example is the collapsible fabric wingsail embodiment and the number of different methods in which this may be achieved. Just one of these such methods is illustrated in FIG. 19, showing the wingsail 810 in the erected position with, for illustrative purposes, the fabric skin removed therefrom.

Figure 20:
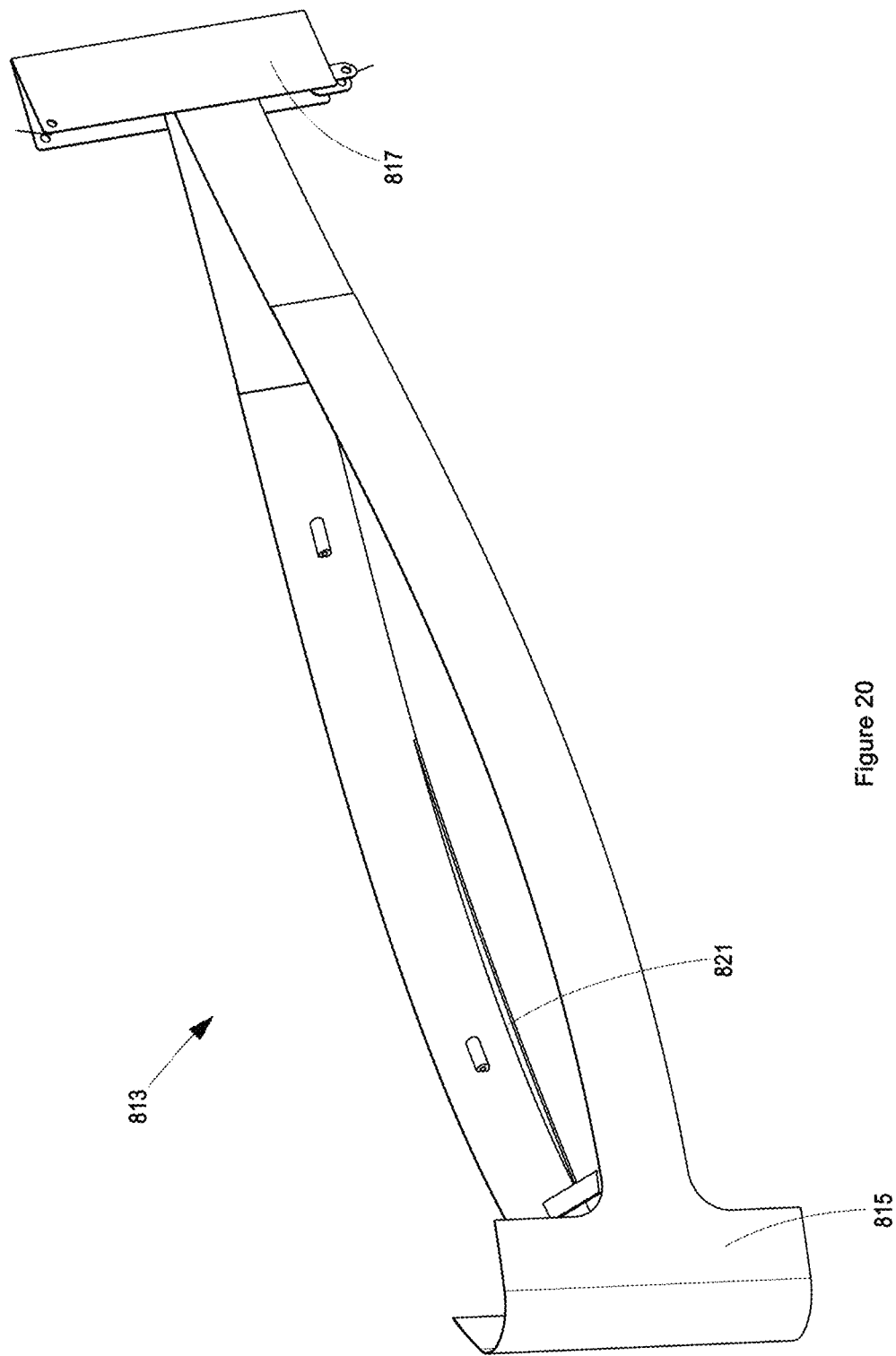
FIG. 20 is a perspective view of one of a plurality of ribs making up the collapsible wingsail of FIG. 19.

With reference now also to FIG. 20, the wing framework is made up of plurality of ribs 813, that when urged into the erected position, abut one another at leading and trailing edges 820, 822 so as to provide the wingsail 810 with substantially rigid leading and trailing edges, enabling it to operate at high speeds. Preferably, each rib comprises respective leading and trailing edge abutment formations 815, 817, each of which extending outwardly in opposite directions toward the first and second end plates 812, 814.

The plurality of ribs 813 are secured to the fabric skin member (not shown) at spaced intervals between the first and second end plates 812, 814, with opposing ends of skin member further being anchored at or near the first and second end plates 812, 814. In the erected position, the first and second end plates 812, 814 are urged away from one another by an extending collapsible mast 819 into the erected position illustrated in FIG. 19.

Although the collapsible mast 819 is illustrated as a telescoping mast, it will be appreciated that it may be any type of collapsible mast, including a scissor lift mast or a piston mast. Furthermore, the rib may include a stiffening formation 821 for stiffening the rib, and/or for providing a surface on which a super-jacent rib may rest with the wing in the collapsed position.

Figure 21:
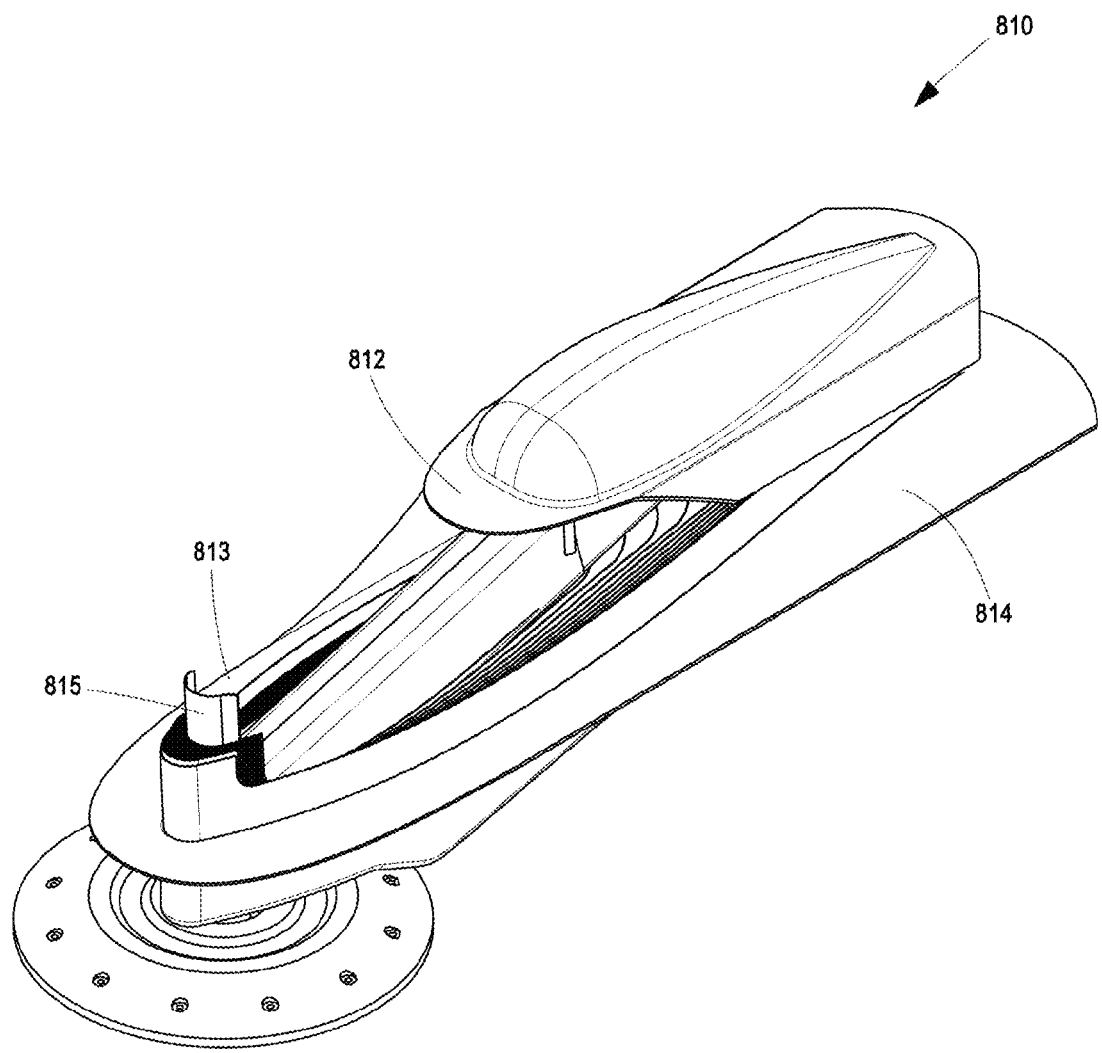
FIG. 21 is a perspective view of the collapsible wingsail of figure in a collapsed position.

To collapse the wingsail into a collapsed position as illustrated in FIG. 21, the telescoping mast 819 is retracted to move the first and second end plates 812, 814 toward one another, consequently causing the ribs 813 to move out of abutting arrangement with one another and into a nesting arrangement one within the other to provide a very compact collapsed wingsail 810, preferably being removable from the water-craft and stored in a protective cover.

Another possible modification or variation of the invention is that the neutral aerofoil section is already a reflexed camber aerofoil section and the reflexed camber aerofoil section to which the wing 10 is deformable is a more pronounced reflexed camber aerofoil section.

Another example of a possible modification or variation of the invention is a further alternative configuration of the actuators for enabling variable reflex camber aerofoil section and the ability to increase or decrease the thickness of the wing 910, which is of particular significance to the aircraft industry.

Figure 23:
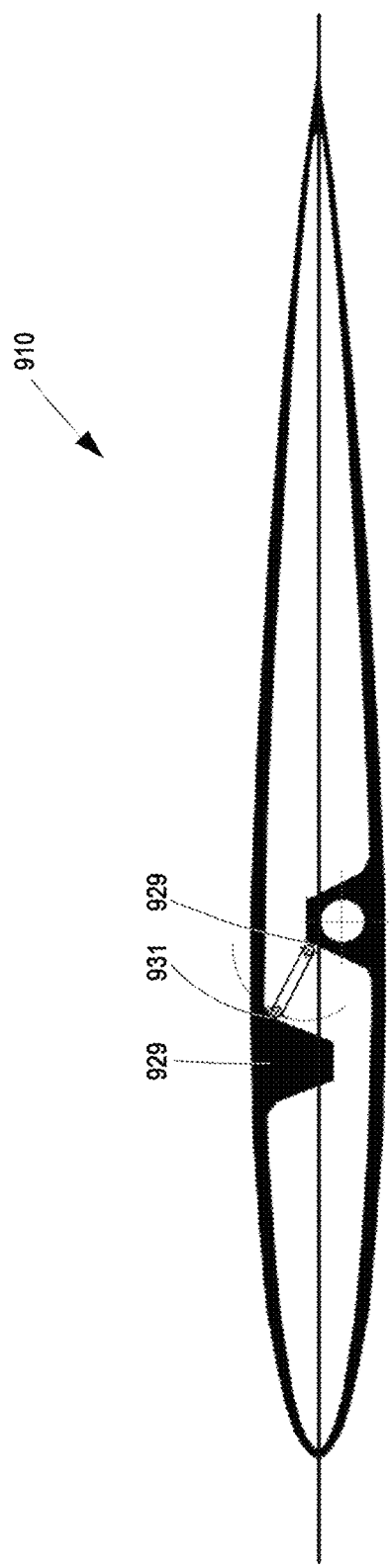
FIG. 23-25 are cross-sectional views of a wing, in the form of a wingsail or otherwise, showing another alternative actuator or actuator variant set-up, for enabling variable reflexed camber aerofoil section deformation and variable wing thickness deformation.
Figure 24:
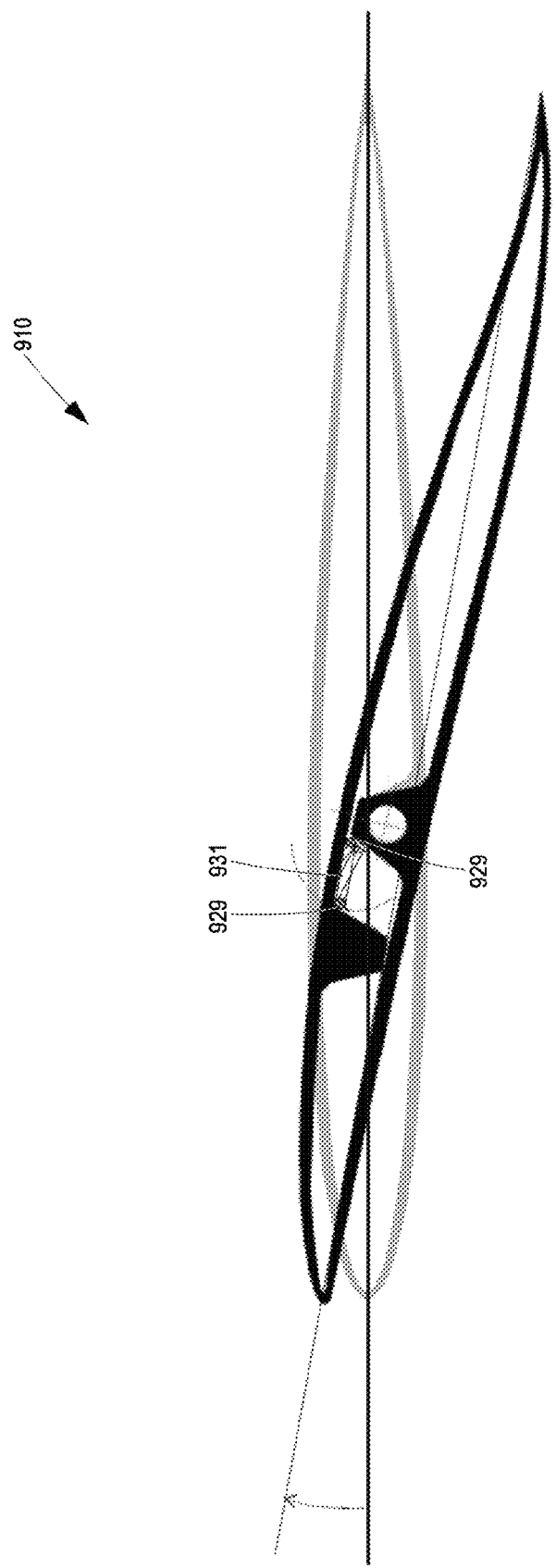
Figure 25:
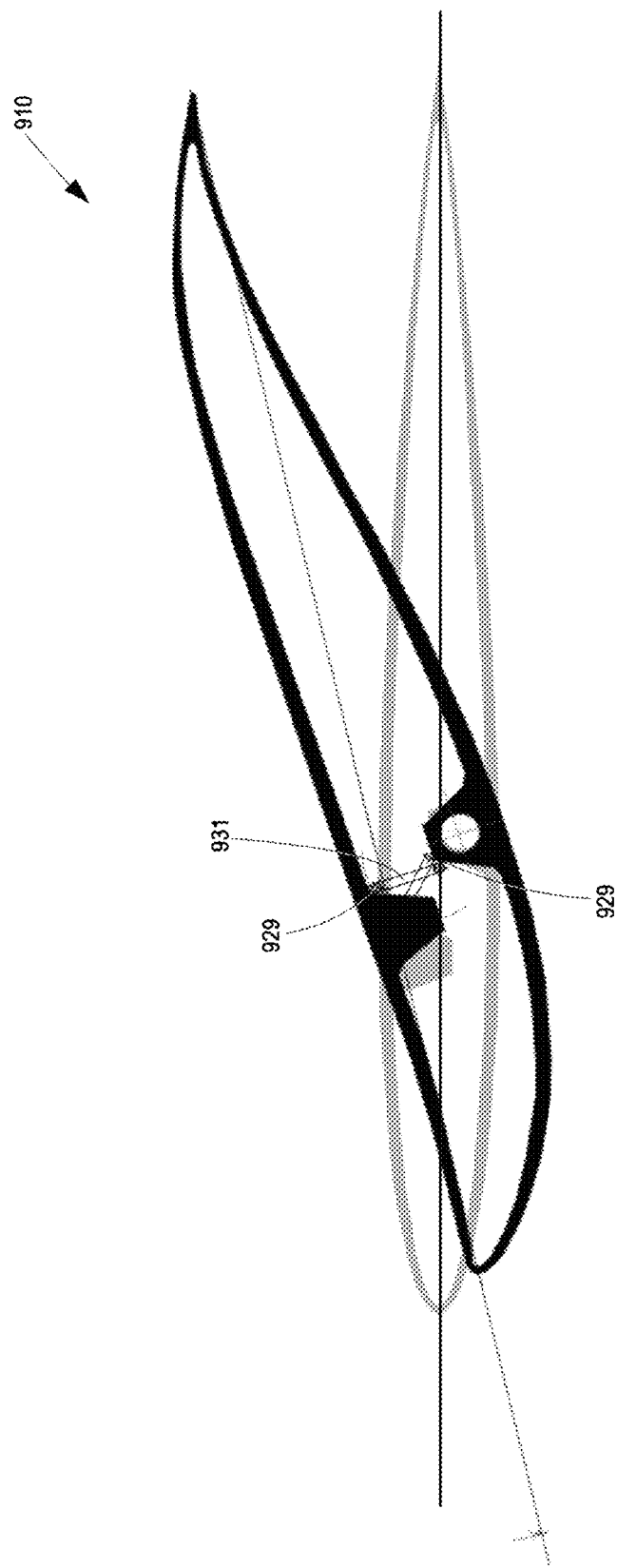

FIG. 23 illustrates a symmetrical aerofoil section of a wing 910 having an actuated member 931 pivotally movable between two actuating points 929, such that angular displacement thereof in one direction causes a reflexed camber aerofoil section and a decrease in the thickness of the wing 910 (FIG. 24), particularly suited to high altitude, high speed cruising. Angular displacement of actuated member 931 in an opposite direction (FIG. 25) causes another reflexed camber aerofoil section and an increase in the thickness of the wing 910, particularly suited to low altitude, low speed cruising for example, as an aircraft is approaching for landing.

It will be appreciated that many different actuator configuration may be employed to obtain a variable reflexed camber, increasing-decreasing aerofoil section (FIG. 26). For example, two actuated members 931A, 931B may be used for enhancing control of the reflexed camber aerofoil section and the thickness such aerofoil section.

It is envisaged that the ability to vary the thickness of the wing will not only significantly reduce adverse yaw and tip stall, being the amongst the greatest contributors to pilot induced fatalities, eliminate the need for a tail boom and rudder, and result in hugely improved fuel economy and reduced aircraft manufacturing costs.

Yet another example of a possible modification or variation of the invention is the application of the wing as one or more active keels extending operatively outwardly from a hull of a water-craft, thereby to provide the water-craft with active roll control, while eliminating the need for heavy, cumbersome weight keels. In use, and through control via the control system, the active keels may be deformed to generate an opposite righting force resisting the inclination of the water-craft (typically, a lifting force substantially opposing the lifting force generated by the wingsail). In this manner, the inclination at which the water-craft travels is controllable, with the possibility of overturning virtually eliminated.

It will be appreciated that the active keels may take many configurations, for example, one or more active keel configured to extend operatively downwardly from the hull: substantially co-planar with the mast; substantially perpendicularly with the mast; or at an angle so as to define an obtuse angle between the active keel and the mast.

The invention claimed is:

1. A wing including:
  a first aerofoil segment and a second aerofoil segment having ends connected or fixed to one another at opposing neutral leading and trailing edges thereby preventing the ends of the first and second aerofoil segments from sliding relative to one another, wherein the first and second aerofoil segments are spaced apart from one another along their lengths across a neutral mean camber line extending between the neutral leading and trailing edges to form a neutral aerofoil section across a wing span of the wing, and further wherein the trailing edge is free to move across the neutral mean camber line;
  opposing first and second ends spaced from one another across the wing span of the wing;
  one or more actuators for deforming the wing between the neutral aerofoil section and a reflexed camber aerofoil section, wherein deformation of the wing from the neutral aerofoil section to the reflexed camber aerofoil section generates a compressive load in the aerofoil segments;
  the first and second aerofoil segments being resilient, wherein the inherent resilience of such first and second aerofoil segments biases the wing towards an initial at rest aerofoil section;
  wherein a critical buckling load of the aerofoil segments is greater than the compressive load generated in the aerofoil segments during deformation of the aerofoil segments by the actuators, thereby to prevent buckling of the aerofoil segments during such deformation;
  such that when the wing is deformed by the actuator, displacement between two points on one of the aerofoil segments generates the compressive load in at least such aerofoil segment, and the ability of such aerofoil segments to resist the compressive load causes such segments to adopt—the reflexed camber aerofoil section form having a reflexed camber line with a point of inflection located nearer the trailing edge than to the leading edge thereof;
  characterized in that the wing is non-symmetrical about a line extending across the neutral aerofoil section perpendicularly to the neutral mean camber line, the wing being:
  (i) mountable to an object at at least one of the first and second ends of the wing; and
  (ii) freely rotatable relative to the object about an axis of rotation passing through the wing span of the wing, the axis of rotation dividing the wing into:
    a. a leading edge part defined between the leading edge, the axis of rotation and the opposing first and seconds ends of the wing; and
    b. a trailing edge part defined between the trailing edge, the axis of rotation and the opposing first and second ends of the wing wingtips;
    c. wherein a surface area of the trailing edge part is greater than the surface area of the leading edge part,
  such that when the wing is in the reflexed camber aerofoil section form, in use, fluid flow acting over the trailing edge induces a moment on the wing causing the wing to freely rotate about the axis of rotation to automatically set an angle of attack relative to the direction of the prevailing fluid flow.

2. A wing according to claim 1, wherein the initial at rest aerofoil section is the section the wing takes with all forces from the actuator operably removed therefrom, the initial at rest aerofoil section being the neutral aerofoil section, the reflexed camber aerofoil section or any aerofoil section therebetween, and further wherein the wing is deformable between the neutral aerofoil section and the reflexed camber aerofoil section progressively, thereby enabling the wing to be deformed by the actuators into a plurality of incrementally different aerofoil sections, some of which having an increased or decreased dimension of maximum thickness.

3. A wing according to claim 2, wherein the first and/or second aerofoil segments:
  are jointly a single integral aerofoil member forming a continuous closed loop rib;
  (ii) are each respectively formed from a single aerofoil member spanning between the leading and trailing edges, jointly to form a continuous closed loop aerofoil rib; or
  (iii) are each respectively formed from a plurality of aerofoil members connected or fixed end-to-end between the leading and trailing edges, jointly to form a continuous closed loop aerofoil rib.

4. A wing according to claim 3, wherein the wing:
  is formed from a plurality of ribs spaced apart relative to one another to define an elongate wing framework; and
  includes a skin supported on the wing framework, the skin being a continuous closed loop skin member having a trailing edge coinciding with the trailing edge of the wing framework, over which skin a fluid is operatively flowable.

5. A wing according to claim 4, wherein the skin member is semi-rigid and resilient thereby to resiliently bias, independently or jointly with the aerofoil segments, the wing towards the initial at rest section, and further wherein the skin member further comprises a critical buckling load similar to that of the aerofoil segments.

6. A wing according to claim 4, wherein the skin member is fabric and the wing framework is configurable between an erected position, wherein the plurality of ribs are retained in a spaced apart relationship to pull the skin member taut over the wing framework, and a collapsed position, wherein the ribs are movable towards, against or substantially to nest within one another to collapse the wing for transportation or storage.

7. A wing according to claim 6, wherein the skin member comprises opposing first and second ends and the plurality of ribs are secured to the skin member at spaced intervals between the opposing first and second ends of the skin member, the opposing first and second ends of the skin member further being respectively connectable, at or near such ends, to opposing first and second ends of a collapsible mast, the collapsible mast being movable between an extended position, wherein the skin member and consequently the ribs secured thereto are urged into the erected position, and a retracted position, wherein the skin member and consequently the ribs secured thereto are returned into the collapsed position.

8. A wing according to claim 7, wherein each of the ribs are configured such that with the wing framework in the erected position, the respective leading edges and trailing edges of adjacent ribs abut one another so as to provide the wing framework with substantially rigid leading and trailing edges, enabling the wing framework to operate at high speeds, the ribs being abuttable on corresponding leading and trailing edge abutment formations, each of the abutment formations extending outwardly in opposite directions from the rib such that in use, the abutment formations extend toward the first or second ends of the erected wing framework.

9. A wing according to claim 2, wherein the first and second aerofoil segments are opposing first and second members of an elongate self-supporting and semi-rigid aerofoil shell, and spaced apart from one another across the neutral camber line, the first and second members each being single aerofoil members, a plurality of aerofoil members connected or fixed end-to-end or integral with one another to form a continuous closed loop aerofoil section, and further wherein the outer surface of the shell is a skin over which fluid is flowable in use.

10. A wing according to claim 8 or claim 9, wherein through the range of deformations of the wing between the neutral aerofoil section and the reflexed camber aerofoil section forms:
  (i) the trailing edge remains located at the same location along the perimeter of the various aerofoil section forms and as such, common to each of the aerofoil section forms throughout the range of deformation thereof, while the location of the leading edge is variable along the perimeter of the various aerofoil section forms as they are deformed from one form to another; and
  (ii) the overall perimeter of the aerofoil section remains substantially constant while the individual lengths of the first and second segments, as measured between the common trailing edge and the variable location of the leading edge, is variable, the leading edge being variable about a nose portion of the aerofoil section of the wing;

such that in use in a prevailing fluid flow, the deformation of the wing toward a first side of the neutral camber line generates a lifting force in a primary direction, while the deformation of the wing toward a second opposite side of the neutral camber line generates a lifting force in a secondary direction being substantially opposite to the primary direction, the reversibility of the wing and the lifting forces generated thereby act as a braking and/or reversing means.

11. A wing according to claim 10, wherein the first and second ends of the wing being unconnected directly to the object form wingtips, which wingtips are connectable to endplates for in use: (i) reducing the effects of wingtip vortices generated by the flow of fluid flowing over the skin of the wing; or (ii) permitting deformation of the wing while sealing such ends of the hollow wing thereby reducing drag.

12. A wing according to claim 2, wherein the neutral aerofoil section is: (i) symmetrical about the neutral camber line and deformable to either side thereof into the reflexed camber aerofoil sections, which sections are lifting aerofoil sections, such that the neutral aerofoil section is intermediary the two fully deform reflexed camber aerofoil sections thereby providing a fully reversible variable aerofoil section wing: or (ii) a reflexed camber aerofoil section and the reflexed camber aerofoil section to which the wing is deformable is a more pronounced reflexed camber aerofoil section, wherein the neutral aerofoil and reflexed camber aerofoil sections are lifting aerofoil sections, with the neutral aerofoil section being asymmetrical relative to the neutral camber line.

13. A wing according to claim 12, wherein the neutral aerofoil section or the reflexed camber aerofoil section are under cambered aerofoil sections, and further wherein a concave shape of the aerofoil segment in which the under camber is defined becomes increasingly tighter as the aerofoil section progressively deforms from the neutral camber aerofoil section to the reflexed camber aerofoil section, the concave shape being formed within or near a zone of maximum thickness of the aerofoil section.

14. A wing according to claim 13, wherein the actuators are abuttable with or connected to rigid, flexible or hinged actuation points on the wing, or on an anchor structure other than the wing, such that the actuation points and the actuators, at least partially or wholly, are located within a wing volume defined by the skin and the wing span of the wing thereby protecting the actuation points and those portions of the actuators housed within the wing volume from the elements.

15. A wing according to claim 14, wherein the aerofoil section is deformable such that the leading edge is deformed toward one side of the neutral camber line and the trailing edge is deformed to an opposite side of the neutral camber line to form the reflexed camber aerofoil section, which reflexed camber line is sinusoidally shaped.

16. A wing according to claim 15, wherein the leading edge of the wing is tilted relative to the axis of rotation such that the axis of rotation divides the wingspan of the wing into a leading edge part, defined between the leading edge and the axis of rotation, and a trailing edge part, defined between the trailing edge and the axis of rotation, wherein the trailing edge part is heavier than the leading edge part thereby to act as a self-righting feature.

17. A wing according to claim 2, wherein the operation of the wing is controllable via one or more control systems, the control system including:
  one or more inputs for receiving inputs from one or more anemometers for measuring fluid speed or direction, fluid-driven turbine, gyroscopes, accelerometers, strain gauges, pressure sensors, position sensors, inclinometers or one or more user inputs, the user inputs being at least an actuator control for deforming the wing between the initial at rest aerofoil section and the reflexed camber aerofoil section, the actuator control being a throttle in the form of a forward-reverse control for actuating the actuators to deform the aerofoil section to one side of the neutral camber line to provide forward propulsion, or to deform the aerofoil section to an opposite side of the neutral camber line to provide reverse propulsion or a braking effect;

databases, protocols or programmes against which the sensor inputs and/of the user inputs are interrogatable; and one or more outputs for controlling the operation of the wing based in use on the interrogation of the sensor inputs and the user inputs against the databases, protocols or programmes.

18. A wing according to claim 2, including a support for mounting the wing on the object, on which support the wing is: (i) rotatable mountable to the object; or (ii) fixed to the object.

19. A wing according to claim 18, wherein the support extends between the wing and:
  (a) a fuselage of an aircraft, the wing being one or more main wings, horizontal tail stabilizers, vertical stabilizers, elevators or rudders;
  (b) a hub or rotor mast, the wing being one or more blades on a propeller, rotor, or fluid-driving or driven turbine;
  (c) a power generating device, the wings being one or more reciprocating blades or rotary blades being driven by fluid energy; or
  (d) a land or water-craft, the wing being:
    (i) in the application of land-craft, one or more wings for generating down-force for increased traction, or one or more wingsails for propelling the land-craft; and
    (ii) in the application of water-craft, one or more rudders for steering the water-craft, one or more keels for stabilizing the water-craft, one or more hydrofoils for lifting the water-craft, or one or more wingsails for propelling the water-craft.

* * * * *

UNITED STATES PATENT AND TRADEMARK OFFICE
CERTIFICATE OF CORRECTION

PATENT NO. : 9,718,532 B2
APPLICATION NO. : 14/647500
DATED : August 1, 2017
INVENTOR(S) : Bray It is certified that error appears in the above-identified patent and that said Letters Patent is hereby corrected as shown below:

In the Claims

Claim 3, Column 26, Line 48:
"are jointly a single integral aerofoil member forming a continuous closed loop rib"
Should read:
--(i) are jointly a single integral aerofoil member forming a continuous closed loop rib--

Claim 17, Column 29, Line 13:
"sensor inputs and/of the user inputs are interrogatable"
Should read:
--sensor inputs and the user inputs are interrogatable--

Signed and Sealed this
Seventh Day of November, 2017

Joseph Matal
*Performing the Functions and Duties of the*
*Under Secretary of Commerce for Intellectual Property and*
*Director of the United States Patent and Trademark Office*